(12) United States Patent
Hua et al.

(10) Patent No.: US 12,471,371 B2
(45) Date of Patent: Nov. 11, 2025

(54) ARRAY SUBSTRATE AND MANUFACTURING METHOD THEREFOR, ELECTRONIC PAPER DISPLAY APPARATUS AND DRIVING METHOD THEREFOR

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Gang Hua, Beijing (CN); Chao Tian, Beijing (CN); Min Wang, Beijing (CN); Dong Wang, Beijing (CN); Zhe Wang, Beijing (CN); Shaobo Li, Beijing (CN); Pengkai Fan, Beijing (CN); Jintang Hu, Beijing (CN); Meng Gong, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 792 days.

(21) Appl. No.: 17/770,020

(22) PCT Filed: Apr. 14, 2021

(86) PCT No.: PCT/CN2021/087164
§ 371 (c)(1),
(2) Date: Apr. 18, 2022

(87) PCT Pub. No.: WO2021/233022
PCT Pub. Date: Nov. 25, 2021

(65) Prior Publication Data
US 2022/0399382 A1 Dec. 15, 2022

(30) Foreign Application Priority Data

May 21, 2020 (CN) .......................... 202010435839.3

(51) Int. Cl.
*H10D 86/60* (2025.01)
*G02F 1/16766* (2019.01)
(Continued)

(52) U.S. Cl.
CPC ......... *H10D 86/60* (2025.01); *G02F 1/16766* (2019.01); *G02F 1/1685* (2019.01); *H10D 86/0221* (2025.01); *H10D 86/441* (2025.01)

(58) Field of Classification Search
CPC ... H10D 86/441; H10D 86/60; G02F 1/16766
See application file for complete search history.

(56) References Cited

U.S. PATENT DOCUMENTS

2002/0140649 A1* 10/2002 Aoyama ........... G02F 1/134363
345/87
2006/0197738 A1 9/2006 Kawai
(Continued)

FOREIGN PATENT DOCUMENTS

| CN | 1828398 A | 9/2006 |
|---|---|---|
| CN | 101620354 A | 1/2010 |

(Continued)

*Primary Examiner* — Peter M Albrecht
(74) *Attorney, Agent, or Firm* — XSENSUS LLP

(57) ABSTRACT

An array substrate has a plurality of sub-pixel regions. The array substrate includes: a substrate; a first transistor and a second transistor that are disposed on a side of the substrate and located in each sub-pixel region; and a first pixel electrode and a second pixel electrode that are disposed on the side of the substrate and located in the sub-pixel region. The first pixel electrode and the second pixel electrode are insulated from each other; the first pixel electrode is elec-
(Continued)

trically connected to the first transistor, and the second pixel electrode is electrically connected to the second transistor.

12 Claims, 9 Drawing Sheets

(51) Int. Cl.
  *G02F 1/1685* (2019.01)
  *H10D 86/01* (2025.01)
  *H10D 86/40* (2025.01)

(56) References Cited

U.S. PATENT DOCUMENTS

| | | |
|---|---|---|
| 2010/0001946 A1 | 1/2010 | Murayama et al. |
| 2010/0085628 A1 | 4/2010 | Lee |
| 2010/0238095 A1* | 9/2010 | Zhang .................. H10D 86/441 345/82 |
| 2013/0314636 A1 | 11/2013 | Chen et al. |
| 2014/0085702 A1 | 3/2014 | Chen et al. |
| 2014/0111099 A1* | 4/2014 | Liu .......................... H10D 86/60 315/160 |
| 2018/0158388 A1 | 6/2018 | Kuo et al. |
| 2018/0314121 A1 | 11/2018 | Fang et al. |
| 2019/0361314 A1 | 11/2019 | Hirano et al. |

FOREIGN PATENT DOCUMENTS

| | | |
|---|---|---|
| CN | 101713896 A | 5/2010 |
| CN | 102998792 A | 3/2013 |
| CN | 103137616 A | 6/2013 |
| CN | 106873264 A | 6/2017 |
| CN | 108132570 A | 6/2018 |
| CN | 111474800 A | 7/2020 |
| CN | 112309337 A | 2/2021 |

* cited by examiner

Form the first pixel electrode and the second pixel electrode on a side of the first transistor and the second transistor in the sub-pixel region away from the substrate by using a same patterning process; an orthographic projection of the first pixel electrode on the substrate and an orthographic projection of the second pixel electrode on the substrate do not overlap, and have a gap therebetween ~ S310a

FIG. 10

Form the second pixel electrode on a side of the first transistor and the second transistor away from the substrate ~ S310b Form the first pixel electrode on a side of the second pixel electrode away from the substrate; an orthographic projection of the first pixel electrode on the substrate partially overlapping with an orthographic projection of the second pixel electrode on the substrate; or an orthographic projection of the first pixel electrode on the substrate not overlapping with an orthographic projection of the second pixel electrode on the substrate, and partial boundaries of the orthographic projection of the first pixel electrode on the substrate and the orthographic projection of the second pixel electrode on the substrate being tangential ~ S320b

FIG. 11

ARRAY SUBSTRATE AND MANUFACTURING METHOD THEREFOR, ELECTRONIC PAPER DISPLAY APPARATUS AND DRIVING METHOD THEREFOR

CROSS-REFERENCE TO RELATED APPLICATIONS

This application is a national phase entry under 35 USC 371 of International Patent Application No. PCT/CN2021/087164, filed on Apr. 14, 2021, which claims priority to Chinese Patent Application No. 202010435839.3, filed on May 21, 2020, which are incorporated herein by reference in their entirety.

TECHNICAL FIELD

The present disclosure relates to the field of display technologies, and in particular, to an array substrate and a manufacturing method therefor, an electronic paper display apparatus and a driving method therefor.

BACKGROUND

Electronic paper display apparatuses have been widely used in the display field due to their characteristics such as lightness and thinness, flexible display, and energy-saving. For example, the electronic paper display apparatuses may be applied to portable products or products with low requirements for dynamic display, such as billboards, bulletin boards, tags, watches, mobile phones, electronic paper readers, or flexible display devices.

SUMMARY

In an aspect, an array substrate is provided. The array substrate has a plurality of sub-pixel regions. The array substrate includes: a substrate; a first transistor and a second transistor that are disposed on a side of the substrate and located in each sub-pixel region; and a first pixel electrode and a second pixel electrode that are disposed on the side of the substrate and located in the sub-pixel region. The first pixel electrode and the second pixel electrode are insulated from each other; the first pixel electrode is electrically connected to the first transistor, and the second pixel electrode is electrically connected to the second transistor.

In some embodiments, the first pixel electrode and the second pixel electrode are disposed in a same layer. An orthographic projection of the first pixel electrode on the substrate and an orthographic projection of the second pixel electrode on the substrate do not overlap, and have a gap therebetween.

In some embodiments, the first pixel electrode is disposed on a side of the second pixel electrode away from the substrate. An orthographic projection of the first pixel electrode on the substrate partially overlaps with an orthographic projection of the second pixel electrode on the substrate; or an orthographic projection of the first pixel electrode on the substrate does not overlap with an orthographic projection of the second pixel electrode on the substrate, and partial boundaries of the orthographic projection of the first pixel electrode on the substrate and the orthographic projection of the second pixel electrode on the substrate are tangential.

In some embodiments, an area of the orthographic projection of the first pixel electrode on the substrate is greater than an area of the orthographic projection of the second pixel electrode on the substrate.

In some embodiments, the second pixel electrode is closer to an edge of the sub-pixel region than the first pixel electrode, and is located on at least one side of the first pixel electrode.

In some embodiments, the array substrate further includes a plurality of data lines extending in a first direction. One of a source and a drain of the first transistor is electrically connected to the first pixel electrode, and another of the source and the drain of the first transistor is electrically connected to a data line of the plurality of data lines. One of a source and a drain of the second transistor is electrically connected to the first pixel electrode or the data line, and another of the source and the drain of the second transistor is electrically connected to the second pixel electrode.

In some embodiments, the array substrate further includes: a third transistor disposed on the side of the substrate and located in the sub-pixel region, one of a source and a drain of the third transistor being electrically connected to the second pixel electrode; and a plurality of common electrode lines extending in a second direction, and another of the source and the drain of the third transistor being electrically connected to a common electrode line of the plurality of common electrode lines, the second direction crossing the first direction.

In some embodiments, the common electrode lines are disposed in a same layer as a gate of the first transistor, a gate of the second transistor, and a gate of the third transistor.

In some embodiments, the array substrate further includes: a first electrode located in the sub-pixel region, the first electrode and the common electrodes line being disposed in a same layer and the first electrode being electrically connected to the common electrode line; and a second electrode located in the sub-pixel region, the second electrode being disposed in a same layer as the source and the drain of the first transistor, and one of the source and the drain of the first transistor that is electrically connected to the first pixel electrode being further electrically connected to the second electrode. The first electrode and the second electrode constitute a first storage capacitor.

In some embodiments, the array substrate further includes: a third electrode located in the sub-pixel region, the third electrode and the common electrode lines being disposed in a same layer, and the third electrode being electrically connected to the common electrode line; and a fourth electrode located in the sub-pixel region, the fourth electrode being disposed in a same layer as the source and the drain of the second transistor. One of the source and the drain of the second transistor that is electrically connected to the second pixel electrode is further electrically connected to the fourth electrode. The third electrode and the fourth electrode constitute a second storage capacitor.

In some embodiments, the array substrate further includes: a plurality of first gate lines, a plurality of second gate lines and a plurality of third gate lines that are disposed in a same layer as a gate of the third transistor and extend in the second direction; and at least one connection portion disposed in each sub-pixel region, the at least one connection portion being disposed in a same layer as the source and the drain of the third transistor, the first pixel electrode or the second pixel electrodes. A gate of the first transistor is electrically connected to a first gate line of the plurality of first gate lines, a gate of the second transistor is electrically connected to a second gate line of the plurality of second gate lines, and the gate of the third transistor is electrically connected to a third gate line of the plurality of third gate lines. The first gate line, the second gate line, and the third gate line are disposed on a same side of the first pixel electrode, each of two gate lines relatively far away from the first pixel electrode is electrically connected to a gate of a respective transistor through a connection portion; or the first gate line, the second gate line, and the third gate line are disposed on two opposite sides of the first pixel electrode, in two gate lines disposed on a side of the first pixel electrode, a gate line relatively far away from the first pixel electrode is electrically connected to a gate of a respective transistor through a connection portion.

In some embodiments, the array substrate further includes a passivation layer disposed between the first pixel electrode and the second pixel electrode. The passivation layer is provided with openings therein, and an opening exposes the second pixel electrode. An orthographic projection of the opening on the substrate and an orthographic projection of the first pixel electrode on the substrate do not overlap, and have a gap therebetween.

In another aspect, a manufacturing method for an array substrate is provided. The manufacturing method for the array substrate includes: providing a substrate, the substrate having a plurality of sub-pixel regions; forming a first transistor and a second transistor in each sub-pixel region of the substrate; and forming a first pixel electrode and a second pixel electrode in the sub-pixel region. The first pixel electrode and the second pixel electrode are insulated from each other, the first pixel electrode is electrically connected to the first transistor, and the second pixel electrode is electrically connected to the second transistor.

In some embodiments, forming the first pixel electrode and the second pixel electrode in the sub-pixel region includes: forming the first pixel electrode and the second pixel electrode on a side of the first transistor and the second transistor in the sub-pixel region away from the substrate by using a same patterning process. An orthographic projection of the first pixel electrode on the substrate and an orthographic projection of the second pixel electrode on the substrate do not overlap, and have a gap therebetween.

In some embodiments, forming the first pixel electrode and the second pixel electrode in the sub-pixel region includes: forming the second pixel electrode on a side of the first transistor and the second transistor away from the substrate; and forming the first pixel electrode on a side of the second pixel electrode in the sub-pixel region away from the substrate. An orthographic projection of the first pixel electrode on the substrate partially overlaps with an orthographic projection of the second pixel electrode on the substrate; or an orthographic projection of the first pixel electrode on the substrate does not overlap with an orthographic projection of the second pixel electrode on the substrate, and partial boundaries of the orthographic projection of the first pixel electrode on the substrate and the orthographic projection of the second pixel electrode on the substrate are tangential.

In some embodiments, forming the first transistor and the second transistor in each sub-pixel region of the substrate includes: forming a gate conductive layer on a side of the substrate, the gate conductive layer including a gate of the first transistor and a gate of the second transistor that are located in each sub-pixel region; forming a source-drain conductive layer on a side of the gate conductive layer away from the substrate, the source-drain conductive layer including a source and a drain of the first transistor and a source and a drain of the second transistor located in each sub-pixel region, and a plurality of data lines extending in a first direction. One of the source and the drain of the first transistor is electrically connected to the first pixel electrode, and another of the source and the drain of the first transistor is electrically connected to a data line of the plurality of data lines. One of the source and the drain of the second transistor is electrically connected to the first pixel electrode or the data line, and another of the source and the drain of the second transistor is electrically connected to the second pixel electrode.

In some embodiments, the manufacturing method for the array substrate further includes: forming a third transistor in each sub-pixel region simultaneously during a process of forming the first transistor and the second transistor. The source-drain conductive layer further includes a source and a drain of the third transistor located in each sub-pixel region. The gate conductive layer further includes a plurality of common electrode lines extending in a second direction and a gate of the third transistor located in each sub-pixel region. The second direction crosses the first direction. One of the source and the drain of the third transistor is electrically connected to the second pixel electrode, and another of the source and the drain of the third transistor is electrically connected to a common electrode line of the plurality of common electrode lines.

In some embodiments, the manufacturing method for the array substrate further includes: forming at least one connection portion in each sub-pixel region simultaneously during a process of forming the source and the drain of the first transistor, the source and the drain of the second transistor, and the source and the drain of the third transistor; or forming at least one connection portion in each sub-pixel region simultaneously during a process of forming the second pixel electrode; or forming at least one connection portion in each sub-pixel region simultaneously during a process of forming the first pixel electrode. The gate conductive layer further includes: a plurality of first gate lines, a plurality of second gate lines, and a plurality of third gate lines that extend in the second direction. The gate of the first transistor is electrically connected to a first gate line of the plurality of first gate lines, the gate of the second transistor is electrically connected to a second gate line of the plurality of second gate lines, and the gate of the third transistor is electrically connected to a third gate line of the plurality of third gate lines. The first gate line, the second gate line and the third gate line are disposed on a same side of the first pixel electrode, each of two gate lines relatively far away from the first pixel electrode is electrically connected to a gate of a respective transistor through a connection portion; or the first gate line, the second gate line, and the third gate line are disposed on two opposite sides of the first pixel electrode, in two gate lines disposed on a side of the first pixel electrode, a gate line relatively far away from the first pixel electrode is electrically connected to a gate of a respective transistor through a connection portion.

In yet another aspect, an electronic paper display apparatus is provided. The electronic paper display apparatus includes: the array substrate as described in some of the above embodiments; an opposite substrate opposite to the array substrate; and a plurality of charged particles disposed between the array substrate and the opposite substrate.

In yet another aspect, a driving method for the electronic paper display apparatus provided in some of the above embodiments is provided. The driving method includes: in a first temperature, controlling the first transistor in the array substrate of the electronic paper display apparatus to be turned on to charge the first pixel electrode in the array substrate, and controlling the second transistor in the array substrate to be turned off; and in a second temperature, controlling the first transistor and the second transistor to be turned on to charge the first pixel electrode and the second pixel electrode in the array substrate. The first temperature is greater than the second temperature.

In some embodiments, in a case where the array substrate includes third transistors each located in a respective sub-pixel region, data lines, first gate lines, second gate lines, third gate lines, and common electrode lines; controlling the first transistor in the array substrate of the electronic paper display apparatus to be turned on to charge the first pixel electrode in the array substrate, and controlling the second transistor in the array substrate to be turned off, includes: transmitting a first control signal to the first transistor through a first gate line of the first gate lines to control the first transistor to be turned on; and transmitting a data voltage to the first pixel electrode through a data line of the data lines to charge the first pixel electrode; and transmitting a second control signal to the second transistor through a second gate line of the second gate lines to control the second transistor to be turned off; controlling the first transistor and the second transistor to be turned on to charge the first pixel electrode and the second pixel electrode, includes: transmitting the first control signal to the first transistor through the first gate line to control the first transistor to be turned on; transmitting a fourth control signal to the second transistor through the second gate line to control the second transistor to be turned on; and transmitting the data voltage to the first pixel electrode and the second pixel electrode through the data line to charge the first pixel electrode and the second pixel electrode; and the driving method further includes: in the first temperature, transmitting a third control signal to the third transistor through a third gate line of the third gate lines to control the third transistor to be turned on; and transmitting a common voltage to the second pixel electrode through a common electrode line of the common electrode lines to charge the second pixel electrode; and in the second temperature, transmitting a fifth control signal to the third transistor through the third gate line to control the third transistor to be turned off.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on an actual size of a product, and an actual process of a method involved in the embodiments of the present disclosure.

FIG. 10 is a flow diagram of a manufacturing method of S300 in the flow diagram shown in FIG. 8;

FIG. 11 is a flow diagram of another manufacturing method of S300 in the flow diagram shown in FIG. 8;

DETAILED DESCRIPTION

Figure 1:
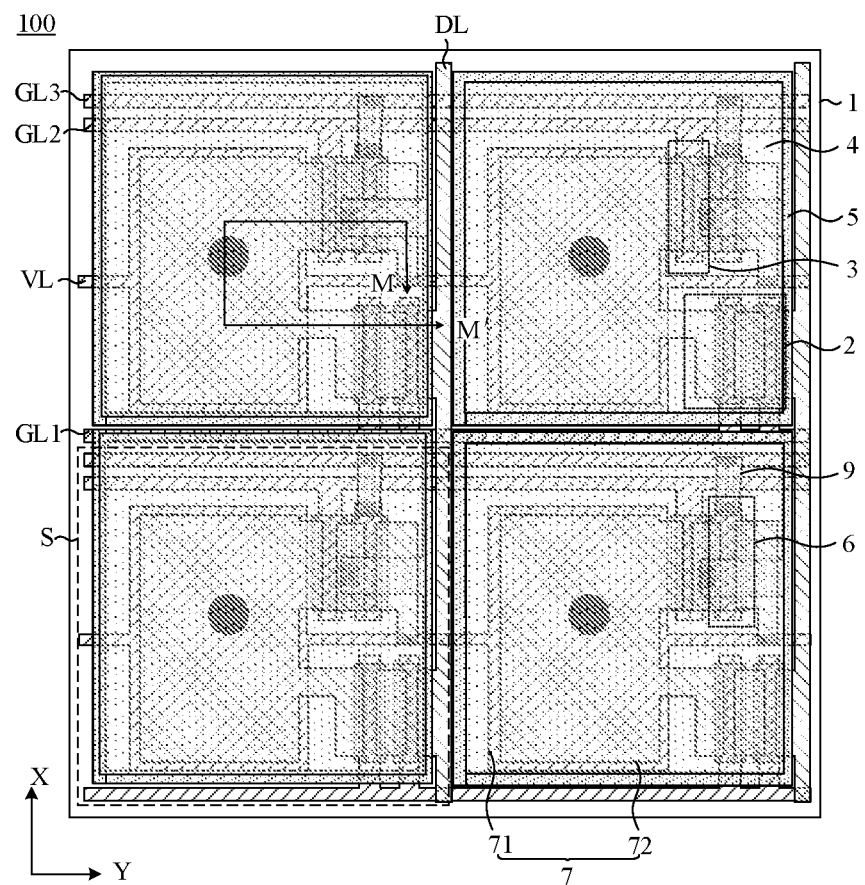
FIG. 1 is a structural diagram of an array substrate, in accordance with some embodiments of the present disclosure.

Technical solutions in some embodiments of the present disclosure will be described clearly and completely below with reference to the accompanying drawings. However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, "a plurality of" or "the plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The use of the phrase "configured to" herein indicates an open and inclusive expression, which does not exclude devices that are applicable to or configured to perform additional tasks or steps.

In addition, the phrase "based on" used herein is meant to be open and inclusive, since a process, step, calculation or other action that is "based on" one or more of the stated conditions or values may, in practice, be based on additional conditions or values exceeding those stated.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of the regions shown herein, but include shape deviations due to, for example, manufacturing. For example, an etched region shown to have a rectangular shape generally has feature of being curved. Therefore, the regions shown in the accompanying drawings are schematic in nature, and their shapes are not intended to show actual shapes of the regions in an apparatus, and are not intended to limit the scope of the exemplary embodiments.

In the related art, an electronic paper display apparatus includes charged particles. The charged particles can undergo electrophoresis due to an action of an electric field, so that the electronic paper display apparatus displays an image. The charged particles have a property of being sensitive to temperature. That is, the activity of the charged particles is relatively strong in a relatively high temperature (e.g., 50° C.), and the activity of the charged particles is relatively low in a relatively low temperature (e.g., 0° C.).

In a case where the electronic paper display apparatus is in a relatively high temperature environment, charged particles in a certain sub-pixel in the electronic paper display apparatus easily move due to interference from electric fields of adjacent sub-pixels, so that the image displayed by the electronic paper display apparatus blurs. As a result, a distance between electrodes for forming electric fields in adjacent sub-pixels requires to be relatively large, so that an area of an electric field formed in each sub-pixel is relatively small. However, in a case where the electronic paper display apparatus is in a relatively low temperature environment, the distance between the electrodes for forming the electric fields in the adjacent sub-pixels requires to be relatively small, so that the area of the electric field formed in each sub-pixel is relatively large, and further all the charged particles in the sub-pixel are driven to move, otherwise grids will easily appear in the displayed image.

In the related art, it is difficult to ameliorate a grid phenomenon of the electronic paper display apparatus in a low temperature while ameliorating an image-blurring phenomenon of the electronic paper display apparatus in a high temperature.

Figure 13:
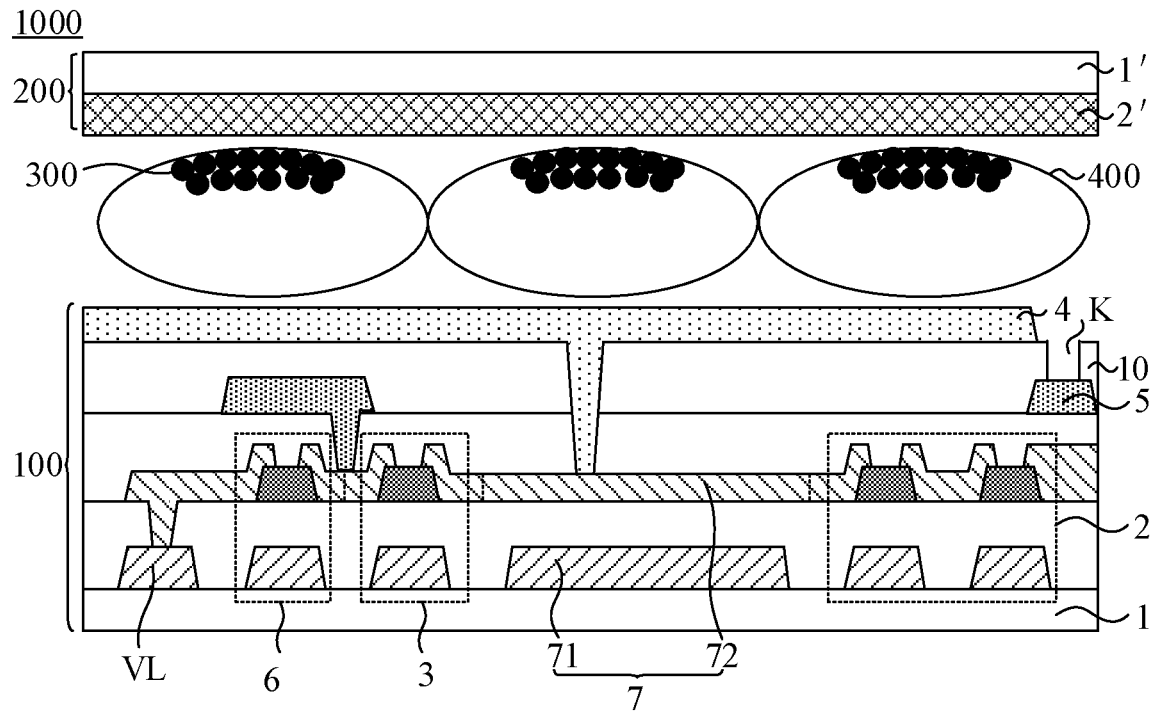
FIG. 13 is a structural diagram of an electronic paper display apparatus, in accordance with some embodiments of the present disclosure.
Figure 14:
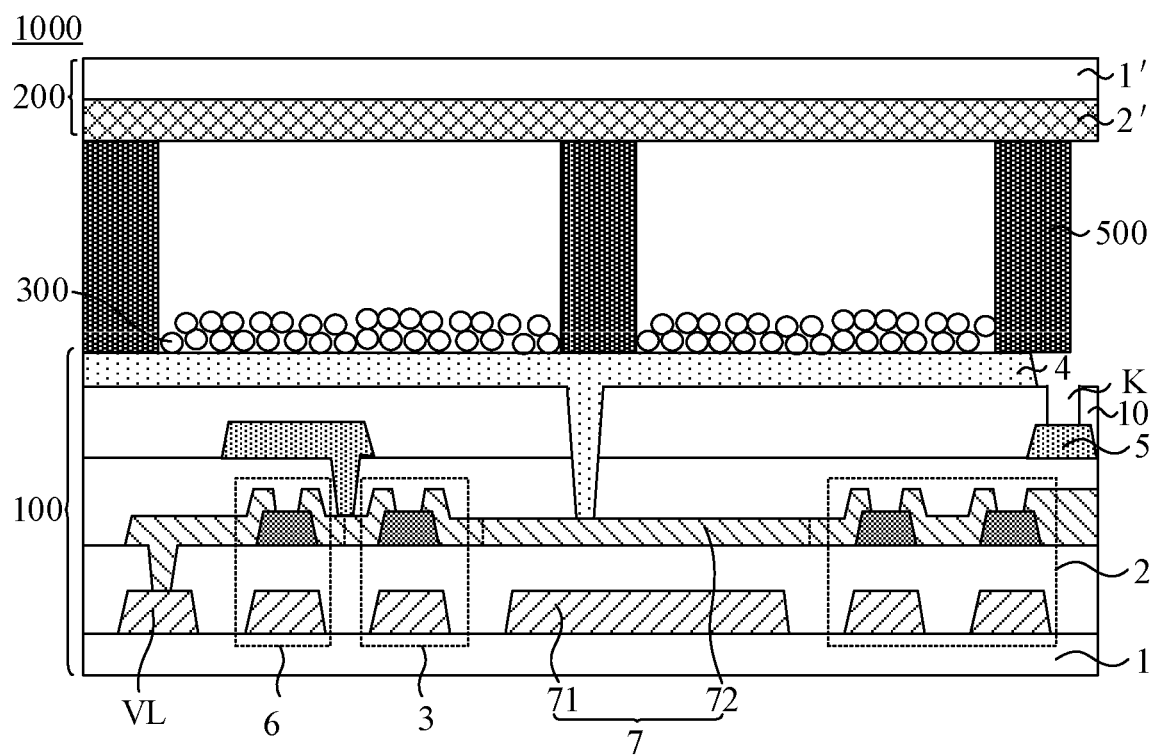
FIG. 14 is a structural diagram of another electronic paper display apparatus, in accordance with some embodiments of the present disclosure.

Based on this, some embodiments of the present disclosure provide an electronic paper display apparatus. As shown in FIGS. 13 and 14, the electronic paper display apparatus 1000 includes an array substrate 100, an opposite substrate 200 opposite to the array substrate 100, and a plurality of charged particles 300 disposed between the array substrate 100 and the opposite substrate 200.

In some embodiments, electric fields can be generated between the array substrate 100 and the opposite substrate 200, so as to drive the plurality of charged particles 300 to move toward the array substrate 100, and/or to move toward the opposite substrate 200. Therefore, the electronic paper display apparatus 1000 is capable of displaying an image through the plurality of charged particles 300.

A structure of the electronic paper display apparatus 1000 provided in some embodiments of the present disclosure will be schematically described below with reference to the accompanying drawings.

As shown in FIG. 1, some embodiments of the present disclosure provide the array substrate 100. The array substrate 100 has a plurality of sub-pixel regions S. The electronic paper display apparatus 1000 includes a plurality of sub-pixels, and the plurality of sub-pixel regions S are in a one-to-one correspondence with the plurality of sub-pixels.

In some examples, as shown in FIGS. 1 to 6, the array substrate 100 includes a substrate 1.

There are various structures of the substrate 1, which may be selectively set according to actual needs. For example, the substrate 1 may be a blank base substrate. For another example, the substrate 1 may include a blank base substrate and at least one functional film (e.g., insulating layer(s) and/or buffer layer(s)) disposed on the blank base substrate.

There are types of the blank base substrate, which may be selectively set according to actual needs.

For example, the blank base substrate may be a rigid base substrate. The rigid base substrate may be, for example, a glass base substrate or a polymethyl methacrylate (PMMA) base substrate.

For another example, the blank base substrate may be a flexible base substrate. The flexible base substrate may be, for example, a polyethylene terephthalate (PET) base substrate, a polyethylene naphthalate two formic acid glycol ester (PEN) base substrate or a polyimide (PI) base substrate.

In some examples, as shown in FIGS. 1 to 7b, the array substrate 100 further includes a first transistor 2 and a second transistor 3 that are disposed on a side of the substrate 1 and located in each sub-pixel region S.

Here, in a case where the substrate 1 includes the blank base substrate and the at least one functional film disposed on the blank base substrate, the first transistor 2 and the second transistor 3 may be located on a side of the at least one functional film away from the blank base substrate.

In some examples, as shown in FIGS. 1 to 7b, the array substrate 100 further includes a first pixel electrode 4 and a second pixel electrode 5 that are disposed on the side of the substrate 1 and located in each sub-pixel region S.

For example, in the same sub-pixel region S, the first pixel electrode 4 and the second pixel electrode 5 are located on a side of the first transistor 2 and the second transistor 3 away from the substrate 1. That is, the first pixel electrode 4 and the second pixel electrode 5 are fabricated later than the first transistor 2 and the second transistor 3.

In some examples, the first pixel electrode 4 and the second pixel electrode 5 are insulated from each other, the first pixel electrode 4 is electrically connected to the first transistor 2, and the second pixel electrode 5 is electrically connected to the second transistor 3.

In a case where the electronic paper display apparatus 1000 is in a relatively high temperature environment, one of the first transistor 2 and the second transistor 3 may be turned on, and the other one may be turned off. In an example in which the first transistor 2 is turned on, only the first pixel electrode 4 may be charged, so that an electric field, between the array substrate 100 and the opposite substrate 200, in each sub-pixel region S has a relatively small area. The electric field with the relatively small area may not only drive charged particles 300 in the respective sub-pixel region S to move, but also avoid interference to charged particles 300 in adjacent sub-pixel regions S.

In a case where the electronic paper display apparatus 1000 is in a relatively low temperature environment, both the first transistor 2 and the second transistor 3 may be turned on. In this way, the electric field, between the array substrate 100 and the opposite substrate 200, in each sub-pixel region S may have a relatively large area, and the electric field with the relatively large area may not only effectively drive the charged particles 300 in the respective sub-pixel region S to move, but also avoid a case where part of the charged particles 300 do not effectively move.

Therefore, in the array substrate 100 provided in the embodiments of the present disclosure, by arranging the first transistor 2 and the second transistor 3 in each sub-pixel region S, and by arranging the first pixel electrode 4 and the second pixel electrode 5 that are respectively electrically connected to the first transistor 2 and the second transistor 3 in each sub-pixel region S, it is possible to achieve separate control of the first pixel electrode 4 and the second pixel electrode 5.

In this way, in the case where the electronic paper display apparatus 1000 is in the relatively high temperature, only one of the first transistor 2 and the second transistor 3 may be turned on to charge the respective pixel electrode, so that the electric field with the relatively small area may be formed between the pixel electrode and the opposite substrate 200. Therefore, it is possible to avoid the interference to the charged particles 300 in the adjacent sub-pixel regions S while the charged particles 300 in the respective sub-pixel region S are driven to move, which effectively ameliorates the image-blurring phenomenon in the high temperature. In the case where the electronic paper display apparatus 1000 is in the relatively low temperature environment, both the first transistor 2 and the second transistor 3 may be turned on to respectively charge the first pixel electrode 4 and the second pixel electrode 5, so that the electric field with the relatively large area may be formed between a whole of the first pixel electrode 4 and the second pixel electrode 5 and the opposite substrate 200. Therefore, it is possible to drive all the charged particles 300 in the respective sub-pixel region S to move, which effectively ameliorates the grid phenomenon of the electronic paper display apparatus 1000 in the low temperature.

There are various arrangements of the first pixel electrode 4 and the second pixel electrode 5, which may be selectively set according to actual needs.

Figure 4:
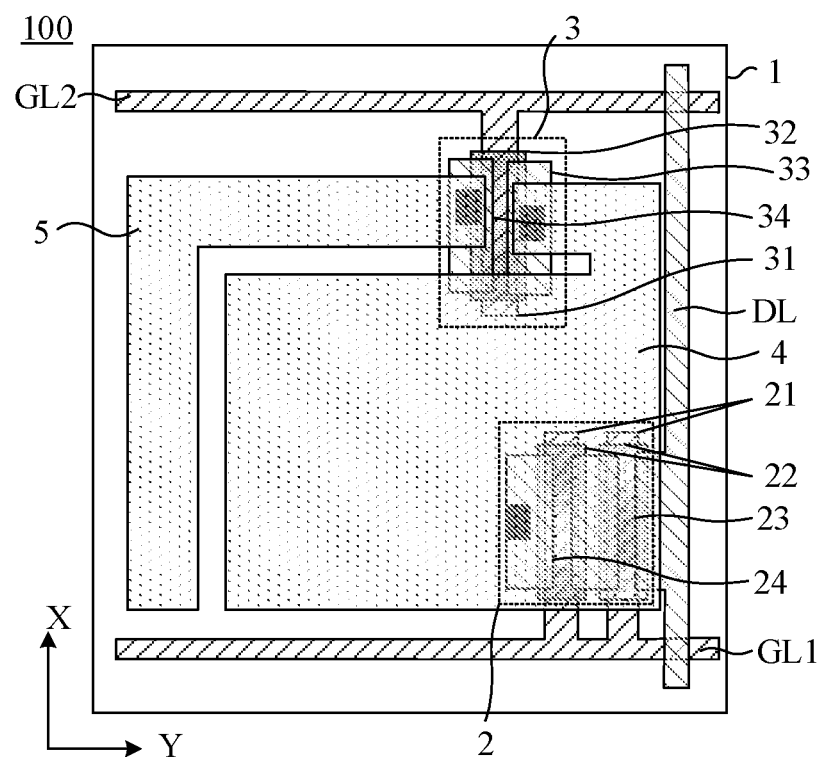
FIG. 4 is a structural diagram of yet another array substrate, in accordance with some embodiments of the present disclosure.
Figure 5:
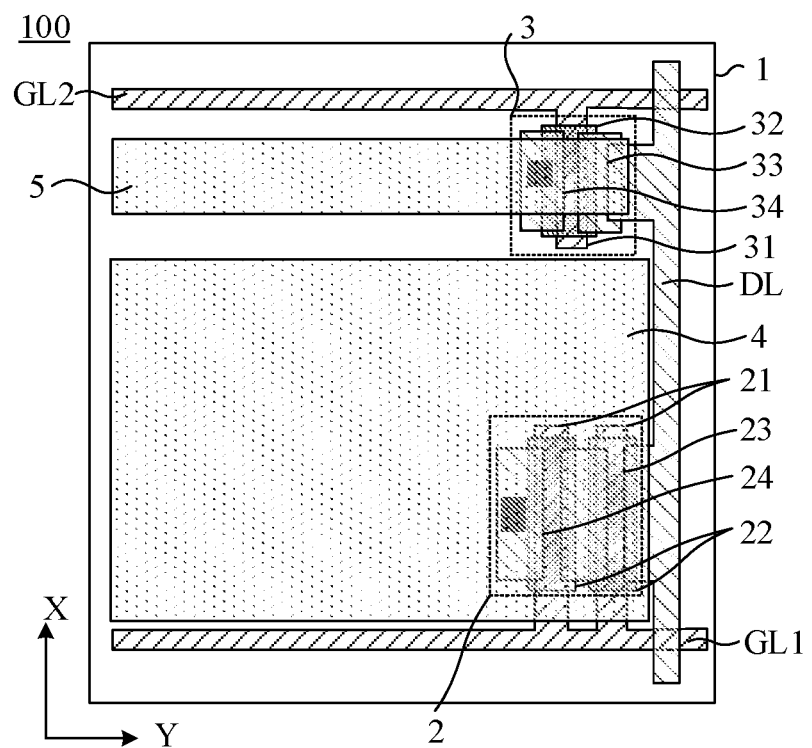
FIG. 5 is a structural diagram of yet another array substrate, in accordance with some embodiments of the present disclosure.

In some embodiments, as shown in FIGS. 4 and 5, the first pixel electrode 4 is disposed in the same layer as the second pixel electrode 5.

Here, it will be noted that the "same layer" mentioned herein refers to a layer structure formed by forming a film layer for forming a specific pattern through the same film forming process and then performing a single patterning process using the same mask. Depending on the different specific patterns, the single patterning process may include multiple exposure, development or etching processes, and the specific patterns in the formed layer structure may be continuous or discontinuous, and these specific patterns may also be at different heights or have different thicknesses. In this way, the first pixel electrode 4 and the second pixel electrode 5 may be fabricated simultaneously, which helps simplify a manufacturing process of the array substrate 100.

In some examples, as shown in FIGS. 4 and 5, an orthographic projection of the first pixel electrode 4 on the substrate 1 and an orthographic projection of the second pixel electrode 5 on the substrate 1 do not overlap, and have a gap therebetween. In this way, it is possible to ensure that the first pixel electrode 4 and the second pixel electrode 5 are in an insulating state, prevent the first pixel electrode 4 and the second pixel electrode 5 from being short-circuited, and effectively avoid the image-blurring phenomenon of the display device 1000 in the high temperature.

Here, a size of the gap between the orthographic projection of the first pixel electrode 4 on the substrate 1 and the orthographic projection of the second pixel electrode 5 on the substrate 1 may be selectively set according to actual needs.

In some other embodiments, as shown in FIGS. 1 to 3, 6 and 15, the first pixel electrode 4 and the second pixel electrode 5 are located in different layers.

Here, in the embodiments of the present disclosure, a structure of the array substrate 100 will be schematically described by taking an example in which the first pixel electrode 4 is disposed on a side of the second pixel electrode 5 away from the substrate 1.

Figure 15:
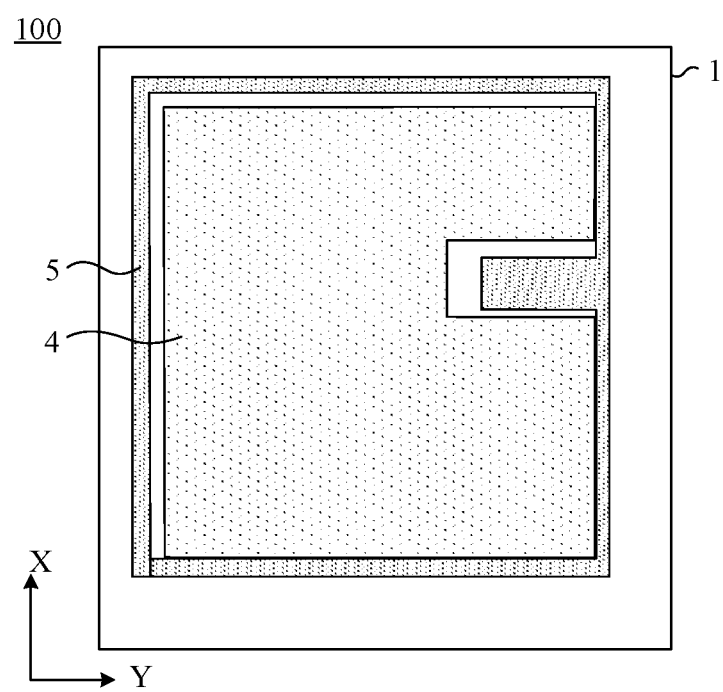
FIG. 15 is a structural diagram of yet another array substrate, in accordance with some embodiments of the present disclosure.

In some examples, as shown in FIGS. 1 to 3, and 6, an orthographic projection of the first pixel electrode 4 on the substrate 1 partially overlaps with an orthographic projection of the second pixel electrode 5 on the substrate 1. Alternatively, as shown in FIG. 15, the orthographic projection of the first pixel electrode 4 on the substrate 1 does not overlap with the orthographic projection of the second pixel electrode 5 on the substrate 1, and partial boundaries of the orthographic projection of the first pixel electrode 4 on the substrate 1 and the orthographic projection of the second pixel electrode 5 on the substrate 1 are tangential.

In this way, it may be possible to not only ensure that the electric field in each sub-pixel region S has the relatively large area in the low temperature environment, but also ensure that the electric field in each sub-pixel region S has the relatively small area in the high temperature environment, so that the grid phenomenon of the electronic paper display apparatus 1000 in the low temperature is effectively ameliorated while the image-blurring phenomenon of the electronic paper display apparatus 1000 in the high temperature is effectively ameliorated. Moreover, in the case where the electronic paper display apparatus 1000 is in the relatively low temperature environment, the electric field with the relatively large area may be used to ensure that the electronic paper display apparatus 1000 has a relatively large aperture rate.

Here, a size of a region where the orthographic projection of the first pixel electrode 4 on the substrate 1 overlaps with the orthographic projection of the second pixel electrode 5 on the substrate 1 may be selectively set according to actual needs.

Of course, considering process errors of fabricating the first pixel electrode 4 and the second pixel electrode 5, the orthographic projection of the first pixel electrode 4 on the substrate 1 and the orthographic projection of the second pixel electrode 5 on the substrate 1 do not overlap, and have a gap therebetween.

In some embodiments, as shown in FIGS. 1 to 6, for an area of the orthographic projection of the first pixel electrode 4 on the substrate 1 and an area of the orthographic projection of the second pixel electrode 5 on the substrate 1, one of which is larger, and the other of which is smaller. This is convenient to ensure that while the image-blurring phenomenon in the high temperature is effectively ameliorated, the electric field in each sub-pixel region S has the relatively large area in the low temperature environment, so that all charged particles 300 in the sub-pixel region S are driven to move, which avoids the grid phenomenon in the low temperature. Furthermore, it is convenient to ensure that while the grid phenomenon in the low temperature is effectively ameliorated, the electric field in each sub-pixel region S has the relatively small area in the high temperature environment, so as to avoid the interference to the charged particles 300 in the adjacent sub-pixel regions S and further avoid an image-blurring phenomenon in the high temperature.

In some examples, as shown in FIGS. 1 to 6, the area of the orthographic projection of the first pixel electrode 4 on the substrate 1 is greater than the area of the orthographic projection of the second pixel electrode 5 on the substrate 1.

In this way, in the case where the first pixel electrode 4 is disposed on the side of the second pixel electrode 5 away from the substrate 1, a distance between the first pixel electrode 4 with a relatively large area and the opposite substrate 200 may be reduced. In the case where the electronic paper display apparatus 1000 is in the relatively high temperature environment, it is possible to ensure a good property of the electric field generated between the first pixel electrode 4 and the opposite substrate 200, thereby ensuring a good driving effect of the electric field on the charged particles 300.

In some examples, a size of the area of the orthographic projection of the first pixel electrode 4 on the substrate 1 and a size of the area of the orthographic projection of the second pixel electrode 5 on the substrate 1 may be selectively set according to a size of an area of the sub-pixel region S.

Here, there are various positional relationships between the first pixel electrode 4 and the second pixel electrode 5, which may be selectively set according to actual needs.

In some examples, as shown in FIGS. 1 to 5, the second pixel electrode 5 is closer to an edge of the sub-pixel region S than the first pixel electrode 4 and is located on at least one side of the first pixel electrode 4. That is, the second pixel electrode 5 is located at a position proximate to the edge of the sub-pixel region S, and the first pixel electrode 4 is substantially located in a middle of the sub-pixel region S. In this way, in the case where the electronic paper display apparatus 1000 is in the relatively high temperature environment, the electric field generated between the first pixel electrode 4 and the opposite substrate 200 may be located in the middle of the sub-pixel region S as much as possible, which helps ensure the driving effect of the electric field on the charged particles 300.

Figure 2:
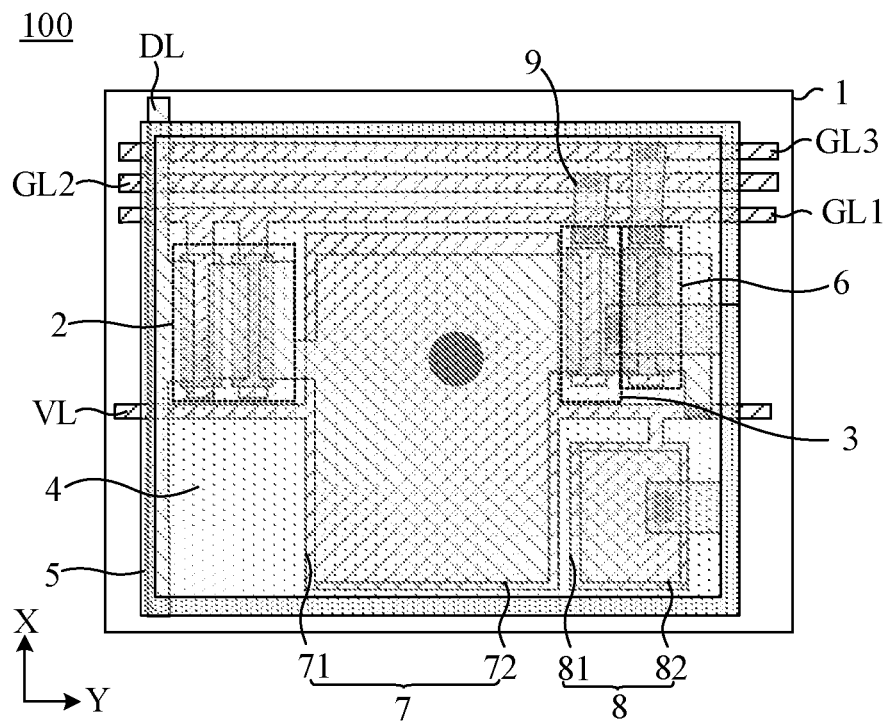
FIG. 2 is a structural diagram of another array substrate, in accordance with some embodiments of the present disclosure.
Figure 3:
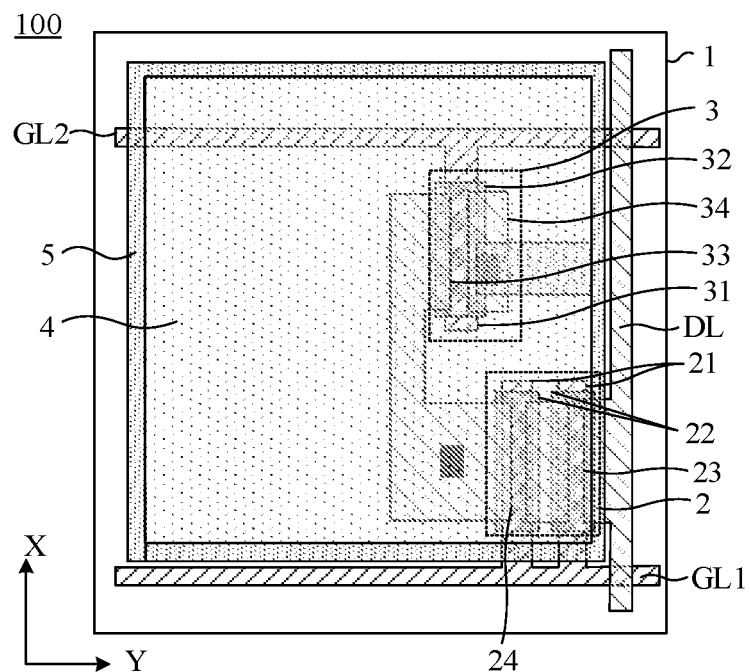
FIG. 3 is a structural diagram of yet another array substrate, in accordance with some embodiments of the present disclosure.

For example, the second pixel electrode 5 is located on one side (as shown in FIG. 5), two sides (as shown in FIG. 4), three sides or peripheral sides (as shown in FIGS. 1 to 3) of the first pixel electrode 4.

Here, as shown in FIGS. 4 and 5, in the case where the first pixel electrode 4 and the second pixel electrode 5 are disposed in the same layer, the second pixel electrode 5 may be not disposed on the peripheral sides of the first pixel electrode 4, so as to avoid a position where the first pixel electrode 4 and the first transistor 2 are connected. As a result, it is possible to prevent a situation where the first pixel electrode 4 and the second pixel electrode 5 are short-circuited.

In some embodiments, there are various types of the first transistor 2 and the second transistor 3. For example, at least one of the first transistor 2 and the second transistor 3 is a top-gate thin film transistor (that is, a gate is provided on a side of an active layer away from the substrate). For another example, at least one of the first transistor 2 and the second transistor 3 is a bottom-gate thin film transistor (that is, the gate is provided on a side of the active layer proximate to the substrate).

In some examples, the first transistor 2 and the second transistor 3 are of a same type. That is, the first transistor 2 and the second transistor 3 are both top-gate thin film transistors. Alternatively, the first transistor 2 and the second transistor 3 are both bottom-gate thin film transistors. In this way, it helps simplify the manufacturing process of the array substrate 100.

Hereinafter, as shown in FIGS. 1 to 6, in embodiments of the present disclosure, the structure of the array substrate 100 will be schematically described by taking an example in which the first transistor 2 and the second transistor 3 are both the bottom-gate thin film transistors.

In some embodiments, as shown in FIGS. 3 to 6, the first transistor 2 includes: a gate 21 of the first transistor 2, an active layer 22 of the first transistor 2, a source 23 of the first transistor 2, and a drain 24 of the first transistor 2. The active layer 22 of the first transistor 2 is located at a side of the gate 21 of the first transistor 2 away from the substrate 1; and the source 23 of the first transistor 2 and the drain 24 of the first transistor 2 are disposed in a same layer, and are located on a side of the active layer 22 of the first transistor 2 away from the substrate 1. As shown in FIGS. 3 to 6, the second transistor 3 includes: a gate 31 of the second transistor 3, an active layer 32 of the second transistor 3, a source 33 of the second transistor 3, and a drain 34 of the second transistor 3. The active layer 32 of the second transistor 3 is located at a side of the gate 31 of the second transistor 3 away from the substrate 1, and the source 33 of the second transistor 3 and the drain 34 of the second transistor 3 are disposed in a same layer, and are located on a side of the active layer 32 of the second transistor 3 away from the substrate 1.

In some embodiments, as shown in FIGS. 1 to 5, the array substrate 100 further includes a plurality of data lines DL extending in a first direction X. One of the source 23 of the first transistor 2 and the drain 24 of the first transistor 2 is electrically connected to the first pixel electrode 4, and the other one is electrically connected to a data line DL. One of the source 33 of the second transistor 3 and the drain 34 of the second transistor 3 is electrically connected to the first pixel electrode 4 or the data line DL, and the other one is electrically connected to the second pixel electrode 5.

Here, as shown in FIGS. 3 to 5, an operation process of the electronic paper display apparatus 1000 will be schematically described by taking an example in which the source 23 of the first transistor 2 is electrically connected to the data line DL, the drain 24 of the first transistor 2 is electrically connected to the first pixel electrode 4, the source 33 of the second transistor 3 is electrically connected to the first pixel electrode 4 or the data line DL, and the drain 34 of the second transistor 3 is electrically connected to the second pixel electrode 5.

In the case where the electronic paper display apparatus 1000 is in the relatively high temperature environment, the first transistor 2 is in a turn-on state, and the second transistor 3 is in a turn-off state. In this case, a data voltage on the data line DL may be transmitted to the first pixel electrode 4 through the source 23 of the first transistor 2 and the drain 24 of the first transistor 2 in sequence to charge the first pixel electrode 4, so that the electric field is generated between the first pixel electrode 4 and the opposite substrate 200 to drive the charged particles 300 between the first pixel electrode 4 and the opposite substrate 200 to move.

In the case where the electronic paper display apparatus 1000 is in the relatively low temperature environment, the first transistor 2 and the second transistor 3 are both in the turn-on state. In a case where the source 33 of the second transistor 3 is electrically connected to the first pixel electrode 4, the data voltage on the data line DL may be transmitted to the first pixel electrode 4 through the source 23 of the first transistor 2 and the drain 24 of the first transistor 2 in sequence to charge the first pixel electrode 4, and after being transmitted to the first pixel electrode 4, the data voltage may be transmitted to the second pixel electrode 5 through the source 33 of the second transistor 3 and the drain 34 of the second transistor 3 to charge the second pixel electrode 5. As a result, the electric field is generated between the first pixel electrode 4 and the opposite substrate 200 and between the second pixel electrode 5 and the opposite substrate 200, thereby driving the charged particles 300 between the first pixel electrode 4 and the opposite substrate 200 and between the second pixel electrode 5 and the opposite substrate 200 to move. In a case where the source 33 of the second transistor 3 is electrically connected to the data line DL, the data voltage on the data line DL may simultaneously charge the first pixel electrode 4 and the second pixel electrode 5 through the first transistor 2 and the second transistor 3, thereby driving the charged particles 300 to move.

In some examples, sources 23 of first transistors 2, drains 24 of the first transistors 2, sources 33 of second transistors 3, drains 34 of the second transistors 3, and the plurality of data lines DL are disposed in a same layer. In this way, it helps simplify the manufacturing process of the array substrate 100.

In some embodiments, as shown in FIGS. 1 and 2, the array substrate 100 further includes a third transistor 6 disposed on the side of the substrate 1 and located in each sub-pixel region S, and a plurality of common electrode lines VL extending in a second direction Y. The second direction Y crosses the first direction X.

Here, the third transistor 6 may have the same structure as the first transistor 2 and the second transistor 3, which helps simplify the manufacturing process of the array substrate 100.

Figure 6:
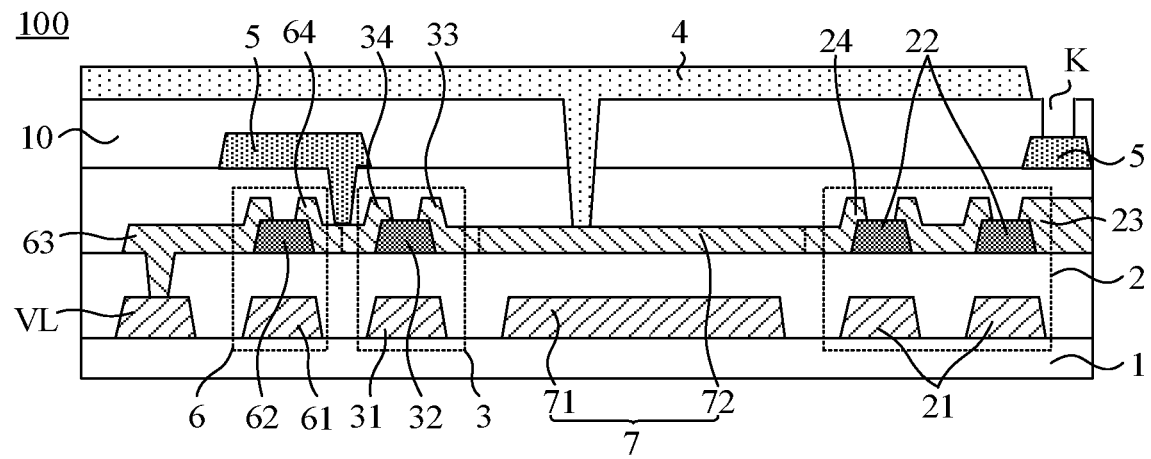
FIG. 6 is a sectional view of the array substrate shown in FIG. 1 taken along M-M' direction.

In some examples, as shown in FIG. 6, the third transistor 6 includes: a gate 61 of the third transistor 6, an active layer 62 of the third transistor 6, a source 63 of the third transistor 6, and a drain 64 of the third transistor 6. The active layer 62 of the third transistor 6 is located at a side of the gate 61 of the third transistor 6 away from the substrate 1, and the source 63 of the third transistor 6 and the drain 64 of the third transistor 6 are disposed in a same layer, and are located on a side of the active layer 62 of the third transistor 6 away from the substrate 1.

In some examples, as shown in FIG. 6, one of the source 63 of the third transistor 6 and the drain 64 of the third transistor 6 is electrically connected to the second pixel electrode 5, and the other one is electrically connected to a common electrode line VL.

Here, as shown in FIG. 6, the structure of the array substrate 100 will be schematically described by taking an example in which the source 63 of the third transistor 6 is electrically connected to the common electrode line VL, and the drain 64 of the third transistor 6 is electrically connected to the second pixel electrode 5.

In the case where the electronic paper display apparatus 1000 is in the relatively high temperature environment, the first transistor 2 is in the turn-on state, the second transistor 3 is in the turn-off state, and the third transistor 6 is in the turn-on state. In this case, the data voltage on the data line DL may be transmitted to the first pixel electrode 4 through the source 23 of the first transistor 2 and the drain 24 of the first transistor 2 in sequence to charge the first pixel electrode 4, so that the electric field is generated between the first pixel electrode 4 and the opposite substrate 200 to drive the charged particles 300 between the first pixel electrode 4 and the opposite substrate 200 to move. A common voltage on the common electrode line VL may be transmitted to the second pixel electrode 5 through the source 63 of the third transistor 6 and the drain 64 of the third transistor 6 in sequence to charge the second pixel electrode 5 (here, a voltage on the opposite substrate 100 is also the common voltage). In this way, it may be possible to prevent the second pixel electrode 5 from being in a floating state, prevent a potential of the second pixel electrode 5 from being interfered, and further prevent the movement of the charged particles 300 from being interfered.

In the case where the electronic paper display apparatus 1000 is in the relatively low temperature environment, the first transistor 2 and the second transistor 3 are both in the turn-on state, and the third transistor 6 is in the turn-off state. A transmission direction of the data voltage on the data line DL may refer to a transmission direction of the data voltage on the data line DL in the case where the electronic paper display apparatus 1000 is in the relatively low temperature environment, and the first transistor 2 and the second transistor 3 are both in the turn-on state in the above examples, which will not be repeated here.

In some examples, as shown in FIGS. 1 and 6, the plurality of common electrode lines VL are disposed in a same layer as gates 21 of the first transistors 2, gates 31 of the second transistors 3, and gates 61 of third transistors 6. In this way, the plurality of common electrode lines VL, and the gate 21 of the first transistor 2, the gate 31 of the second transistor 3, and the gate 61 of the third transistor 6 that are in each sub-pixel region S may be formed in a single patterning process, which effectively simplifies the manufacturing process of the array substrate 100.

In some embodiments, as shown in FIGS. 1, 2, and 6, the array substrate 100 further includes a first storage capacitor 7 located in each sub-pixel region S. The first storage capacitor 7 includes a first electrode 71 and a second electrode 72.

Figure 7A:
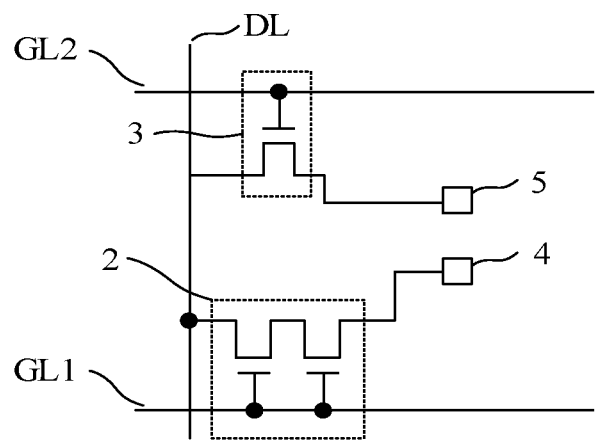
FIG. 7a is an equivalent circuit diagram of the array substrate shown in FIG. 5.
Figure 7B:
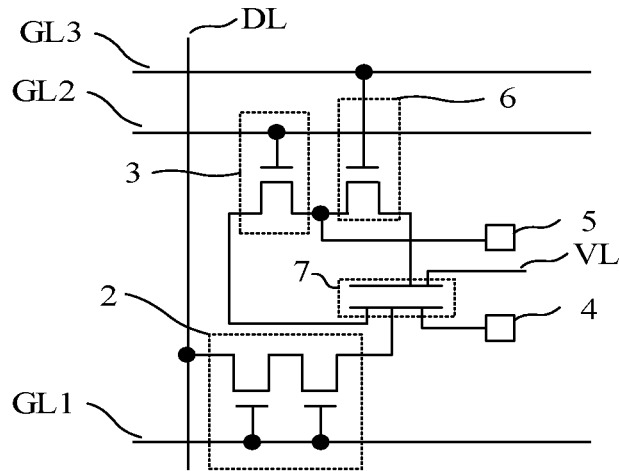
FIG. 7b is an equivalent circuit diagram, in a sub-pixel region, of the array substrate shown in FIG. 1.

In some examples, as shown in FIGS. 6 and 7b, the first electrode 71 is disposed in the same layer as the plurality of common electrode lines VL, and is electrically connected to the common electrode line VL. The second electrode 72 is disposed in the same layer as the source 23 of the first transistor 2 and the drain 24 of the first transistor 2. One of the source 23 and the drain 24 of the first transistor 2 that is electrically connected to the first pixel electrode 4 is further electrically connected to the second electrode 72. In this way, the first storage capacitor 7 may be used as a bridge to transmit the data voltage on the data line DL and the common voltage on the common electrode line VL.

By arranging the first electrode 71 in each sub-pixel region S and the plurality of common electrode lines VL in the same layer, and arranging the second electrode 72 and the source 23 and the drain 24 of the first transistor 2 in each sub-pixel region S in the same layer, it helps simplify the manufacturing process of the array substrate 100.

In some examples, areas of the first electrode 71 and the second electrode 72 are relatively large. In this way, it may be possible to improve a stability of a voltage on the first pixel electrode 4 and/or the second pixel electrode 5 by using the first storage capacitor 7, and maintain an image stability of a display apparatus to which the array substrate 100 is applied.

In some embodiments, as shown in FIG. 2, the array substrate 100 further includes a second storage capacitor 8 located in each sub-pixel region S. The second storage capacitor 8 includes a third electrode 81 and a fourth electrode 82.

In some examples, as shown in FIG. 2, the third electrode 81 is disposed in the same layer as the plurality of common electrode lines VL, and is electrically connected to a common electrode line VL (the common electrode line VL is, for example, the common electrode line VL electrically connected to the first electrode 71). The fourth electrode 82 is disposed in the same layer as the source 33 of the second transistor 3 and the drain 34 of the second transistor 3. One of the source 33 and the drain 34 of the second transistor 3 that is electrically connected to the second pixel electrode 5 is further electrically connected to the fourth electrode 82.

In this way, in the case where the electronic paper display apparatus 1000 is in the low temperature environment, the second storage capacitor 8 may be charged; and in the case where the electronic paper display apparatus 1000 is in the high temperature environment, the common voltage is not transmitted on the common electrode line VL, and the second pixel electrode 5 is charged by discharge of the second storage capacitor 8 to make a voltage on the second pixel electrode 5 be maintained as the common voltage, which ameliorates the image-blurring phenomenon of the electronic paper display apparatus 1000 in the high temperature.

By arranging the third electrode 81 in each sub-pixel region S and the plurality of common electrode lines VL in the same layer, and arranging the fourth electrode 82 and the source 33 and the drain 34 of the second transistor 3 in each sub-pixel region S in the same layer, it helps simplify the manufacturing processes of the array substrate 100.

In some embodiments, as shown in FIGS. 1 and 2, the array substrate 100 further includes: a plurality of first gate lines GL1, a plurality of second gate lines GL2 and a plurality of third gate lines GL3 that are disposed in the same layer as the gates 61 of the third transistors 6 and extend in the second direction Y. The gate 21 of each first transistor 2 is electrically connected to a first gate line GL1, the gate 31 of each second transistor 3 is electrically connected to a second gate line GL2, and the gate 61 of each third transistor 6 is electrically connected to a third gate line GL3.

In some examples, the plurality of sub-pixel regions S in the array substrate may be, for example, arranged in an array. Sub-pixel regions S that are arranged in a row in the second direction Y may be referred to as a same row of sub-pixel regions S. In this case, as shown in FIG. 1, first transistors 2 in the same row of sub-pixel regions S may be electrically connected to a same first gate line GL1, second transistors 3 in the same row of sub-pixel regions S may be electrically connected to a same second gate line GL2, and third transistors 6 in the same row of sub-pixel regions S may be electrically connected to a same third gate line GL3.

In addition, as shown in FIG. 1, sub-pixel regions S that are arranged in a column in the first direction X may be referred to as a same column of sub-pixel regions S. First transistors 2 in the same column of sub-pixel regions S may be electrically connected to a data line DL. Of course, in a case where the second transistor 3 in each sub-pixel region S is also electrically connected to the data line DL, the first transistors 2 and second transistors 3 in the same column of sub-pixel regions S may be electrically connected to the same data line DL.

In some examples, there are various arrangements of the first gate line GL1, the second gate line GL2, and the third gate line GL3 that correspond to the same row of sub-pixel regions S, which may be selectively set according to actual needs.

For example, as shown in FIG. 2, the first gate line GL1, the second gate line GL2, and the third gate line GL3 that correspond to the same row of sub-pixel regions S are disposed on a same side of the first pixel electrode 4.

For example, as shown in FIG. 1, the first gate line GL1, the second gate line GL2, and the third gate line GL3 that correspond to the same row of sub-pixel regions S are disposed on two opposite sides of the first pixel electrode 4. In this case, one of the first gate line GL1, the second gate line GL2, and the third gate line GL3 that correspond to the same row of sub-pixel regions S may be disposed on a side of the first pixel electrode 4, and the other two of the first gate line GL1, the second gate line GL2, and the third gate line GL3 that correspond to the same row of sub-pixel regions S may be disposed on an opposite side of the first pixel electrode 4. For example, as shown in FIG. 1, the first gate line GL1 may be disposed on the side of the first pixel electrode 4, and the second gate line GL2 and the third gate line GL3 may be disposed on the opposite side of the first pixel electrode 4.

Based on this, as shown in FIGS. 1 and 2, the array substrate 100 further includes at least one connection portion 9 disposed in each sub-pixel region S.

For example, in the case where the first gate line GL1, the second gate line GL2, and the third gate line GL3 are disposed on the same side of the first pixel electrode 4, each of two gate lines that are relatively far away from the first pixel electrode 4 is electrically connected to a gate of a respective transistor through a connection portion 9. In this case, two connection portions 9 may be disposed in each sub-pixel region S.

For example, the first gate line GL1, the second gate line GL2, and the third gate line GL3 are arranged in a manner as shown in FIG. 2; and in this case, the second transistor 3 in each sub-pixel region S may be electrically connected to a respective second gate line GL2 through a connection portion 9, and the third transistor 6 in each sub-pixel region S may be electrically connected to a respective third gate line GL3 through another connection portion 9. In this way, it may be possible to prevent the second gate line GL2 and the third gate line GL3 from being short-circuited with the first gate line GL1, and ensure that a signal is normally transmitted on each gate line.

For example, in the case where the first gate line GL1, the second gate line GL2, and the third gate line GL3 are disposed on the two opposite sides of the first pixel electrode 4, in two gate lines disposed on the same side of the first pixel electrode 4, a gate line relatively far away from the first pixel electrode 4 is electrically connected to a gate of a respective transistor through a connection portion 9. In this case, one connection portion 9 may be disposed in each sub-pixel region S.

For example, the first gate line GL1, the second gate line GL2, and the third gate line GL3 are arranged in a manner as shown in FIG. 1; and in this case, the third transistor 6 in each sub-pixel region S may be electrically connected to the respective third gate line GL3 through the connection portion 9. In this way, it may be possible to prevent the second gate line GL2 and the third gate line GL3 from being short-circuited, and ensure that the signal is normally transmitted on each gate line.

Here, there are various arrangements of the connection portion(s) 9, which may be selectively set according to actual needs. For example, the at least one connection portion 9 in each sub-pixel region S may be disposed in the same layer as the source 63 of the third transistor 6 and the drain 64 of the third transistor 6, the first pixel electrode 4 or the second pixel electrode 5. In this way, it helps simplify the manufacturing process of the array substrate 100.

In some embodiments, as shown in FIG. 6, in the case where the first pixel electrode 4 is disposed on the side of the second pixel electrode 5 away from the substrate 1, the array substrate 100 further includes a passivation layer 10 disposed between the first pixel electrode 4 and the second pixel electrode 5. The passivation layer 10 may make the first pixel electrode 4 be insulated from the second pixel electrode 5.

In some examples, as shown in FIG. 6, the passivation layer 10 is provided with openings K therein, and an opening K exposes the second pixel electrode 5. An orthographic projection of the opening K on the substrate 1 and the orthographic projection of the first pixel electrode 4 on the substrate 1 do not overlap, and have a gap therebetween. That is, the opening K exposes a surface of the second pixel electrode 5 away from the substrate 1, and the first pixel electrode 4 and the second pixel electrode 5 are still insulated from each other, which prevents the first pixel electrode 4 and the second pixel electrode 5 from being short-circuited.

By providing the opening K that exposes the second pixel electrode 5 in the passivation layer 10, the electric field generated between the second pixel electrode 5 and the opposite substrate 200 may be enhanced, which improves the driving effect of the electric field on the charged particles 300.

Here, a thickness of the passivation layer 10 may be selectively set according to actual needs, as long as the first pixel electrode 4 and the second pixel electrode 5 can be prevented from being short-circuited.

In some examples, the thickness of the passivation layer 10 is 800 Å, 1000 Å or 1200 Å. By arranging the passivation layer 10 with a relatively small thickness, a distance between the second pixel electrode 5 and the opposite substrate 200 may be reduced, and the electric field generated between the second pixel electrode 5 and the opposite substrate 200 may be enhanced.

In addition, it will be noted that there are various types of the first transistor 2, the second transistor 3, and the third transistor 6, which are not limited in the embodiments. For example, the first transistor 2 may be a double-gate transistor, and the second transistor 3 and the third transistor 6 may both be single-gate transistors.

Some embodiments of the present disclosure provide the electronic paper display apparatus 1000. As shown in FIGS. 13 and 14, the opposite substrate 200 included in the electronic paper display apparatus 1000 includes an opposite base 1' and a common electrode layer 2' disposed on a side of the opposite base 1' proximate to the array substrate 100. Electric fields can be generated between the common electrode layer 2' and the first pixel electrodes 4 in the array substrate 100. Alternatively, Electric fields can be generated between the common electrode layer 2' and the first pixel electrodes 4 and between the common electrode layer 2' and the second pixel electrodes 5 in the array substrate 100. As a result, the charged particles 300 may be driven to move, and thus the electronic paper display apparatus 1000 may realize display.

The common electrode layer 2' may be of a structure constituted by a whole thin film. Alternatively, the common electrode layer 2' includes a plurality of common electrode patterns. The plurality of common electrode patterns may be, for example, in a one-to-one correspondence with the plurality of sub-pixel regions S.

In some examples, there are various types of the plurality of charged particles 300 included in the electronic paper display apparatus 1000, which may be selectively set according to actual needs. For example, the plurality of charged particles 300 include charged particles of at least one color in a plurality of black charged particles, a plurality of white charged particles and a plurality of red charged particles. Of course, the plurality of charged particles 300 may further include charged particles of other colors, which is not limited in the embodiments of the present disclosure.

In some examples, the plurality of charged particles 300 are light-reflecting particles. That is, the plurality of charged particles 300 can reflect light incident on them. In this way, natural light may be used as a light source required by the electronic paper display apparatus 1000 for display, which helps reduce the power consumption of the electronic paper display apparatus 1000 for display.

The array substrate 100 included in the electronic paper display apparatus 1000 has a same structure and beneficial effects as the array substrate 100 provided in the above embodiments, and details will not be repeated here.

There are various arrangements of the plurality of charged particles 300 between the array substrate 100 and the opposite substrate 200, which may be selectively set according to actual needs.

In some examples, as shown in FIG. 13, a plurality of microcapsules 400 are provided between the array substrate 100 and the opposite substrate 200, and at least one microcapsule 400 may be provided in each sub-pixel region S.

The plurality of charged particles 300 are located in the plurality of microcapsules 400, and each microcapsule 400 is provided with some charged particles 300 therein.

In some other examples, as shown in FIG. 14, a plurality of microcup structures 500 are provided between the array substrate 100 and the opposite substrate 200, and at least one microcup structure 500 may be provided in each sub-pixel region S.

The plurality of charged particles 300 are located in the plurality of microcup structures 500, and each microcup structure 500 is provided with some charged particles 300 therein.

Some embodiments of the present disclosure provide a driving method for the electronic paper display apparatus as described in the above embodiments. The driving method is configured to drive the electronic paper display apparatus in a first temperature or a second temperature, so that the electronic paper display apparatus performs display.

In some embodiments, the first temperature is greater than the second temperature. The first temperature may be a temperature in the relatively high temperature environment mentioned in the above embodiments, and the temperature is, for example, approximately 50° C. The second temperature may be a temperature in the relatively low temperature environment mentioned in the above embodiments, and the temperature is, for example, approximately 0° C.

In some examples, as shown in FIG. 7a, in the first temperature, the driving method includes: controlling the first transistor 2 in the array substrate of the electronic paper display apparatus to be turned on to charge the first pixel electrode 4 in the array substrate; and controlling the second transistor 3 in the array substrate to be turned off. In this case, in the array substrate, the second pixel electrode 5 is not charged, and only the first pixel electrode 4 may cooperate with the common electrode layer in the opposite substrate, so that the electric field is generated between the first pixel electrode 4 and the common electrode layer. As a result, the charged particles in the sub-pixel region between the array substrate and the opposite substrate are driven to move, so that the electronic paper display apparatus realizes the display.

In this way, in the relatively high temperature environment, an area of the electric field formed in each sub-pixel region of the electronic paper display apparatus may be relatively small, which may effectively avoid interference to the charged particles in the adjacent sub-pixel regions, and further avoids the image-blurring phenomenon of the electronic paper display apparatus in the high temperature.

In some other examples, as shown in FIG. 7a, in the second temperature, the driving method further includes: controlling the first transistor 2 and the second transistor 3 to be turned on to charge the first pixel electrode 4 and the second pixel electrode 5 in the array substrate. In this case, the first pixel electrode 4 and the second pixel electrode 5 may all cooperate with the common electrode layer in the opposite substrate, so that the electric field is generated between the first pixel electrode 4 and the common electrode layer, and between the second pixel electrode 5 and the common electrode layer. As a result, the charged particles in the sub-pixel region between the array substrate and the opposite substrate are driven to move, so that the electronic paper display apparatus realizes the display.

In this way, in the relatively low temperature environment, an area of the electric field formed in each sub-pixel region of the electronic paper display apparatus may be relatively large, which may not only ensure that the charged particles in the respective sub-pixel region are effectively driven to move, so as to avoid the case where the part of the charged particles do not effectively move, but also avoid the grid phenomenon of the electronic paper display apparatus in the low temperature.

In some embodiments, as shown in FIG. 7b, the array substrate further includes the third transistors 6, the data lines DL, the first gate lines GL1, the second gate lines GL2, the third gate lines GL3 and the common electrode lines VL; and in this case, the driving method for the electronic paper display apparatus is as follows.

In some examples, in the first temperature, the driving method includes: transmitting a first control signal to the first transistor 2 through the first gate line GL1 to control the first transistor 2 to be turned on; transmitting the data voltage to the first pixel electrode 4 through the data line DL to charge the first pixel electrode 4; transmitting a second control signal to the second transistor 3 through the second gate line GL2 to control the second transistor 3 to be turned off; transmitting a third control signal to the third transistor 6 through the third gate line GL3 to control the third transistor 6 to be turned on; and transmitting the common voltage to the second pixel electrode 5 through the common electrode line VL to charge the second pixel electrode 5.

In this case, since there is no difference between a voltage on the common electrode layer of the opposite substrate and the common voltage on the second pixel electrode 5, no electric field is formed between the common electrode layer and the second pixel electrode 5. There is a voltage difference between the first pixel electrode 4 and the common electrode layer, and the electric field may be formed between the first pixel electrode 4 and the common electrode layer. In this way, it is possible to use the electric field to drive the charged particles in the sub-pixel region between the array substrate and the opposite substrate to move, so that the electronic paper display apparatus realizes the display.

In this way, in the relatively high temperature environment, the area of the electric field formed in each sub-pixel region of the electronic paper display apparatus may be relatively small, which may effectively avoid the interference to the charged particles in the adjacent sub-pixel regions, and further avoids the image-blurring phenomenon of the electronic paper display apparatus in the high temperature. Moreover, by transmitting the common voltage to the second pixel electrode 5, it may be possible to prevent the second pixel electrode 5 from being in the floating state, prevent the potential of the second pixel electrode 5 from being interfered, and further prevent the movement of the charged particles from being interfered.

Here, the first control signal is a control signal that controls the first transistor 2 to be turned on, the second control signal is a control signal that controls the second transistor 3 to be turned off, and the third control signal is a control signal that controls the third transistor 6 to be turned on.

In some other examples, in the second temperature, the driving method includes: transmitting the first control signal to the first transistor 2 through the first gate line GL1 to control the first transistor 2 to be turned on; transmitting a fourth control signal to the second transistor 3 through the second gate line GL2 to control the second transistor 3 to be turned on; transmitting the data voltage to the first pixel electrode 4 and the second pixel electrode 5 through the data line DL to charge the first pixel electrode 4 and the second pixel electrode 5; and transmitting a fifth control signal to the third transistor 6 through the third gate line GL3 to control the third transistor 6 to be turned off.

In this case, there are a voltage difference between the first pixel electrode 4 and the common electrode layer, and the voltage difference between the second pixel electrode 5 and the common electrode layer, so that the electric field may be formed between the first pixel electrode 4 and the common electrode layer, and between the second pixel electrode 5 and the common electrode layer. In this way, it is possible to use the electric field to drive the charged particles in the sub-pixel region between the array substrate and the opposite substrate to move, so that the electronic paper display apparatus realizes the display.

In this way, in the relatively low temperature environment, an area of the electric field formed in each sub-pixel region of the electronic paper display apparatus may be relatively large, which may not only ensure that the charged particles in the respective sub-pixel region are effectively driven to move, so as to avoid the case where the part of the charged particles do not effectively move, but also avoid the grid phenomenon of the electronic paper display apparatus in the low temperature.

Here, a fourth control signal is a control signal that controls the second transistor 3 to be turned on, and the fifth control signal is a control signal that controls the third transistor 6 to be turned off.

In addition, temperature detection structure(s) may be provided in the electronic paper display apparatus. In this way, in the driving method, driving modes in different temperatures may be switched according to temperature(s) detected by the temperature detection structure(s).

Figure 8:
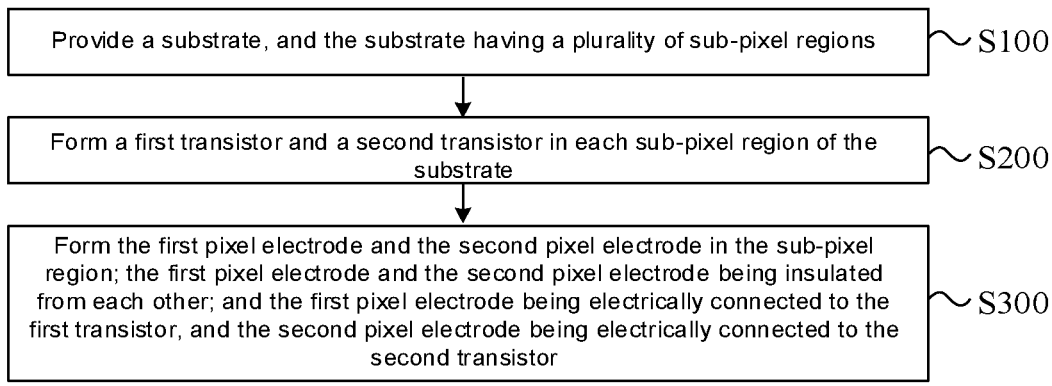
FIG. 8 is a flow diagram of a manufacturing method for an array substrate, in accordance with some embodiments of the present disclosure.

Some embodiments of the present disclosure provide a manufacturing method for an array substrate. As shown in FIG. 8, the manufacturing method for the array substrate includes steps 100 to 300 (S100 to S300).

Figure 12:
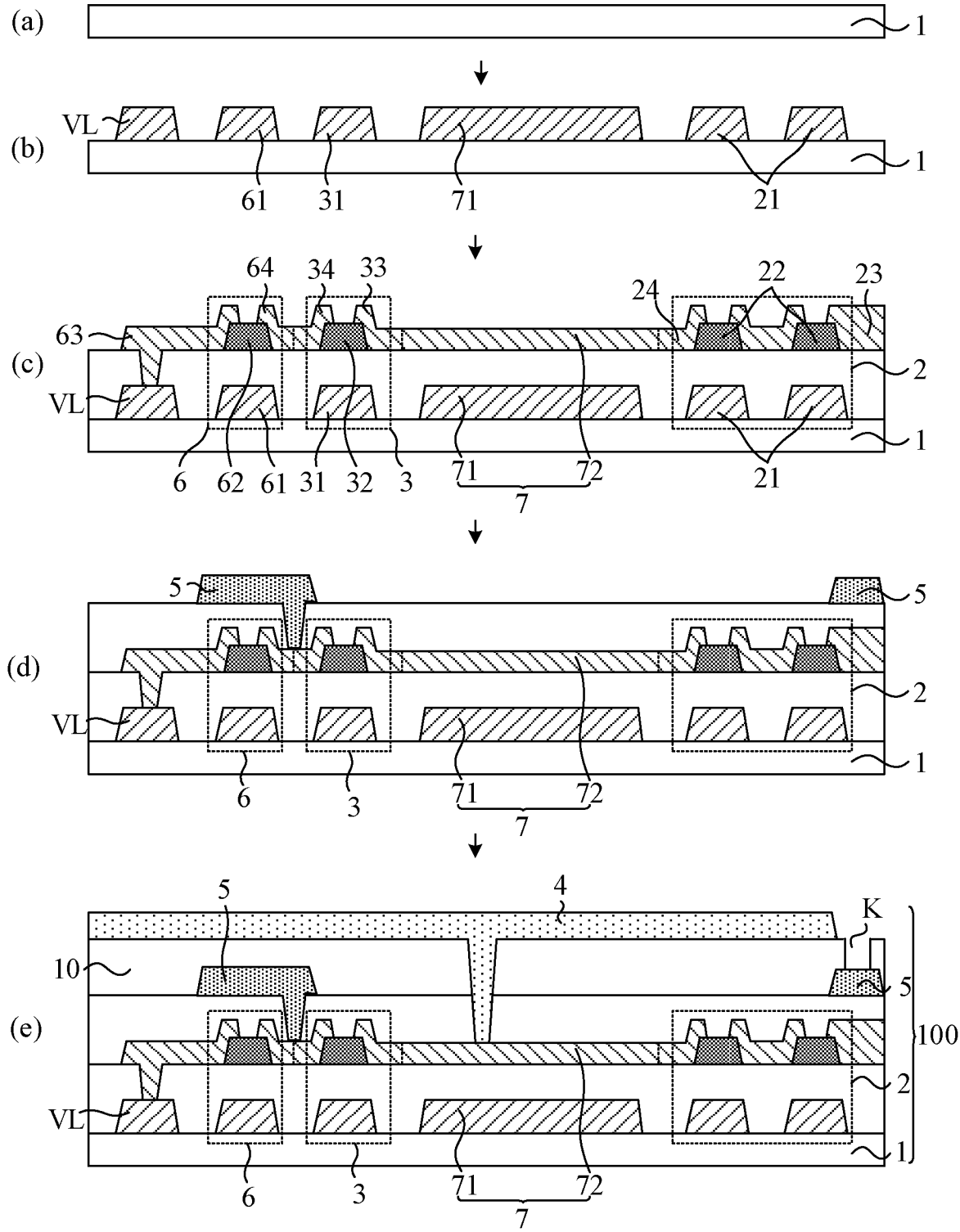
FIG. 12 is a step diagram of a manufacturing method for an array substrate, in accordance with some embodiments of the present disclosure.

In S100, as shown in (a) in FIG. 12, a substrate 1 is provided. The substrate 1 has a plurality of sub-pixel regions S (as shown in FIG. 1). The plurality of sub-pixel regions S may be, for example, arranged in an array.

Here, for a type and structure of the substrate 1, reference may be made to the description of the type and structure of the substrate 1 in the above embodiments, and details will not be repeated here.

In S200, as shown in (c) in FIG. 12, a first transistor 2 and a second transistor 3 are formed in each sub-pixel region S of the substrate 1.

A process of forming the first transistor 2 and the second transistor 3 will be schematically described below by taking an example in which the first transistor 2 and the second transistor 3 are both bottom-gate thin film transistors.

Figure 9:
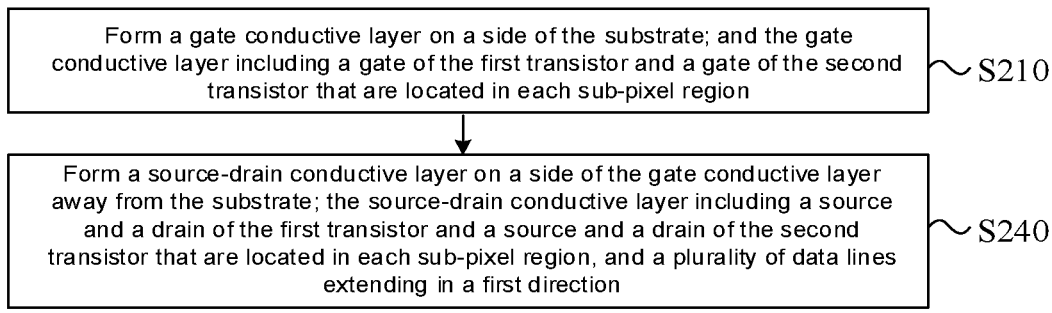
FIG. 9 is a flow diagram of a manufacturing method of S200 in the flow diagram shown in FIG. 8.

In some examples, as shown in FIG. 9, forming the first transistor 2 and the second transistor 3 in each sub-pixel region S of the substrate 1 in S200 includes steps 210 and 240 (S210 and S240).

In S210, as shown in (b) in FIG. 12, a gate conductive layer is formed on a side of the substrate 1. The gate conductive layer includes a gate 21 of the first transistor 2 and a gate 31 of the second transistor 3 that are in each sub-pixel region S.

For example, a first conductive film may be formed on the side of the substrate 1 by using a sputtering process, and then the first conductive film may be etched by using a photolithography process or a wet etching process to obtain the gate conductive layer.

In S240, as shown in (c) in FIG. 12, a source-drain conductive layer is formed on a side of the gate conductive layer away from the substrate 1. The source-drain conductive layer includes a source 23 of the first transistor 2, a drain 24 of the first transistor 2, a source 33 of the second transistor 3, and a drain 34 of the second transistor 3 that are located in each sub-pixel region S, and a plurality of data lines DL extending in a first direction X.

For example, a second conductive film may be formed on the side of the gate conductive layer away from the substrate 1 by using the sputtering process, and then the second conductive film may be etched by using the photolithography process or the wet etching process to obtain the source-drain conductive layer.

In some examples, one of the source 23 of the first transistor 2 and the drain 24 of the first transistor 2 is electrically connected to a first pixel electrode 4, and the other one is electrically connected to a data line DL. One of the source 33 of the second transistor 3 and the drain 34 of the second transistor 3 is electrically connected to the first pixel electrode 4 or the data line DL, and the other one is electrically connected to a second pixel electrode 5.

Here, one of the source 23 of the first transistor 2 and the drain 24 of the first transistor 2 that is electrically connected to the data line DL may be formed, for example, an integrated structure with the data line DL. One of the source 33 of the second transistor 3 and the drain 34 of the second transistor 3 that is electrically connected to the data line DL may be formed, for example, an integrated structure with the data line DL.

In some examples, after S210 and before S240, forming the first transistor 2 and the second transistor 3 in each sub-pixel region S of the substrate 1 in S200 further includes steps 220 and 230 (S220 and S230).

In S220, as shown in (c) in FIG. 12, a gate insulating layer is formed on the side of the gate conductive layer away from the substrate 1.

In S230, as shown in (c) in FIG. 12, an active pattern layer 30 is formed on a side of the gate insulating layer away from the substrate 1. The active pattern layer includes an active layer 22 of the first transistor 2 and an active layer 32 of the second transistor 3 that are in each sub-pixel region S.

In the source-drain conductive layer formed subsequently, the source 23 of the first transistor 2 and the drain 24 of the first transistor 2 are connected to the active layer 22 of the first transistor 2, and the source 33 of the second transistor 3 and the drain 34 of the second transistor 3 are connected to the active layer 32 of the second transistor 3.

In S300, as shown in (e) in FIG. 12, the first pixel electrode 4 and the second pixel electrode 5 are formed in each sub-pixel region S. The first pixel electrode 4 and the second pixel electrode 5 are insulated from each other, the first pixel electrode 4 is electrically connected to the first transistor 2, and the second pixel electrode 5 is electrically connected to the second transistor 3.

In some examples, the first pixel electrode 4 and the second pixel electrode 5 may be made of a transparent conductive material. For example, the first pixel electrode 4 and the second pixel electrode 5 may be made of indium tin oxide (ITO), indium zinc oxide (IZO), aluminum doped zinc oxide (AZO), fluorine doped tin oxide (FTO) or antimony doped tin oxide (ATO), etc.

Beneficial effects that may be achieved by the manufacturing method for the array substrate provided in the embodiments of the present disclosure are the same as beneficial effects that may be achieved by the array substrate provided in the above embodiments, which will not be repeated here.

In the S300, there are various methods for forming the first pixel electrode 4 and the second pixel electrode 5, which may be selectively set according to an arrangement of the first pixel electrode 4 and the second pixel electrode 5.

In some embodiments, the first pixel electrode 4 and the second pixel electrode 5 are disposed in a same layer. In this case, as shown in FIG. 10, forming the first pixel electrode 4 and the second pixel electrode 5 in each sub-pixel region S in S300 includes a step 310*a* (S310*a*).

In S310*a*, as shown in FIGS. 4 and 5, the first pixel electrode 4 and the second pixel electrode 5 are formed on a side of the first transistor 2 and the second transistor 3 away from the substrate 1 by using a same patterning process. An orthographic projection of the first pixel electrode 4 on the substrate 1 and an orthographic projection of the second pixel electrode 5 on the substrate 1 do not overlap, and have a gap therebetween.

For example, a first transparent conductive film may be formed on the side of the first transistor 2 and the second transistor 3 away from the substrate 1 by using the sputtering process, and then the first transparent conductive film may be patterned by using the photolithography process or the wet etching process to obtain the first pixel electrode 4 and the second pixel electrode 5.

In some other embodiments, the first pixel electrode 4 and the second pixel electrode 5 are located in different layers. In an example in which the first pixel electrode 4 is disposed on a side of the second pixel electrode 5 away from the substrate 1, as shown in FIG. 11, forming the first pixel electrode 4 and the second pixel electrode 5 in each sub-pixel region S in S300 includes steps S310b and S320b (S310b and S320b).

In S310b, as shown in (d) in FIG. 12, the second pixel electrode 5 is formed on a side of the first transistor 2 and the second transistor 3 away from the substrate 1.

For example, a second transparent conductive film may be formed on the side of the first transistor 2 and the second transistor 3 away from the substrate 1 by using the sputtering process, and then the second transparent conductive film may be patterned by using the photolithography process or the wet etching process to obtain the second pixel electrode 5.

In S320b, as shown in (e) in FIG. 12, the first pixel electrode 4 is formed on the side of the second pixel electrode 5 away from the substrate 1. The orthographic projection of the first pixel electrode 4 on the substrate 1 partially overlaps with the orthographic projection of the second pixel electrode 5 on the substrate 1. Alternatively, the orthographic projection of the first pixel electrode 4 on the substrate 1 does not overlap with the orthographic projection of the second pixel electrode 5 on the substrate 1, and partial boundaries of the orthographic projection of the first pixel electrode 4 on the substrate 1 and the orthographic projection of the second pixel electrode 5 on the substrate 1 are tangential.

For example, a third transparent conductive film may be formed on the side of the first transistor 2 and the second transistor 3 away from the substrate 1 by using the sputtering process, and then the third transparent conductive film may be patterned by using the photolithography process or the wet etching process to obtain the first pixel electrode 4. Materials of the second transparent conductive film and the third transparent conductive film may be the same or different.

Here, considering errors in the processes of patterning the first pixel electrode 4 and the second pixel electrode 5, in a case where the orthographic projection of the first pixel electrode 4 on the substrate 1 and the orthographic projection of the second pixel electrode 5 on the substrate 1 do not overlap, there may further be a gap between the orthographic projection of the first pixel electrode 4 on the substrate 1 and the orthographic projection of the second pixel electrode 5 on the substrate 1.

In some embodiments, as shown in (b) and (c) in FIG. 12, the manufacturing method for the array substrate further includes: forming a third transistor 6 in each sub-pixel region S simultaneously in the process of forming the first transistor 2 and the second transistor 3 in S200.

In other words, the gate conductive layer formed in S210 further includes a gate 61 of the third transistor 6 located in each sub-pixel region S. The active pattern layer formed in S230 further includes an active layer 62 of the third transistor 6 located in each sub-pixel region S. The source-drain conductive layer formed in S240 further includes a source 63 and a drain 64 of the third transistor 6 in each sub-pixel region S. One of the source 63 of the third transistor 6 and the drain 64 of the third transistor 6 is electrically connected to the second pixel electrode 5.

In some examples, as shown in FIG. 1, the gate conductive layer further includes a plurality of common electrode lines VL extending in a second direction Y. The second direction Y crosses the first direction X. The other of the source 63 of the third transistor 6 and the drain 64 of the third transistor 6 is electrically connected to a common electrode line VL.

In some embodiments, as shown in FIG. 1, the gate conductive layer further includes: a plurality of first gate lines GL1, a plurality of second gate lines GL2, and a plurality of third gate lines GL3 that are extends in the second direction Y. The gate 21 of each first transistor 2 is electrically connected to a first gate line GL1, the gate 31 of each second transistor 3 is electrically connected to a second gate line GL2, and the gate 61 of each third transistor 6 is electrically connected to a third gate line GL3. In this way, the plurality of first gate lines GL1, the plurality of second gate lines GL2 and the plurality of third gate lines GL3 may be used to control respective first transistors 2, second transistors 3, and third transistors 6 to be turned on or off.

Thus, first transistors 2 in a same row of sub-pixel regions S may be electrically connected to a same first gate line GL1, second transistors 3 in the same row of sub-pixel regions S may be electrically connected to a same second gate line GL2, and third transistors 6 in the same row of sub-pixel regions S may be electrically connected to a same third gate line GL3.

Considering the arrangements of patterns in the gate conductive layer, there are various arrangement manners of the first gate line GL1, the second gate line GL2, and the third gate line GL3.

For example, the first gate line GL1, the second gate line GL2, and the third gate line GL3 may be disposed on a same side of the first pixel electrode 4, or on two opposite sides of the first pixel electrode 4.

In some examples, as shown in FIG. 2, in the case where the first gate line GL1, the second gate line GL2, and the third gate line GL3 are disposed on the same side of the first pixel electrode 4, two connection portions 9 are provided in each sub-pixel region S of the array substrate 100. Each of two gate lines relatively far away from the first pixel electrode 4 is electrically connected to a gate of a respective transistor through a connection portion 9. In this way, a phenomenon that gate lines are short-circuited may be avoided.

In some other examples, as shown in FIG. 1, in the case where the first gate line GL1, the second gate line GL2, and the third gate line GL3 are disposed on the two opposite sides of the first pixel electrode 4, one connection portion 9 is provided in each sub-pixel region S of the array substrate 100. In two gate lines disposed on the same side of the first pixel electrode 4, a gate line that is relatively far away from the first pixel electrode 4 is electrically connected to a gate of a respective transistor through the connection portion 9. In this way, the phenomenon that the gate lines are short-circuited may be avoided.

Based on this, in some examples, the manufacturing method for the array substrate further includes: forming at least one connection portion 9 in each sub-pixel region S.

Here, manners in which the at least one connection portion 9 is formed in each sub-pixel region S are various, which may be selectively set according to actual needs.

For example, during a process of forming the source 23 of the first transistor 2, the drain 24 of the first transistor 2, the source 33 of the second transistor 3, the drain 34 of the second transistor 3, the source 63 of the third transistor 6, and the drain 64 of the third transistor 6 in each sub-pixel region S, the at least one connection portion 9 located in each sub-pixel region S is simultaneously formed. That is, the at least one connection portion 9 in each sub-pixel region S may be formed when the source-drain conductive layer is formed.

For example, in a process of forming the second pixel electrode 5 in each sub-pixel region S, the at least one connection portion 9 located in each sub-pixel region S is simultaneously formed. That is, the at least one connection portion 9 and the second pixel electrode 5 in each sub-pixel region S may be formed in a patterning process.

For example, in a process of forming the first pixel electrode 4 in each sub-pixel region S, the at least one connection portion 9 located in each sub-pixel region S is simultaneously formed. That is, the at least one connection portion 9 and the first pixel electrode 4 in each sub-pixel region S may be formed in a patterning process.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An array substrate having a plurality of sub-pixel regions, the array substrate comprising:
    a substrate;
    a first transistor and a second transistor that are disposed on a side of the substrate and located in each sub-pixel region;
    a first pixel electrode and a second pixel electrode that are disposed on the side of the substrate and located in the sub-pixel region, the first pixel electrode being disposed on a side of the second pixel electrode away from the substrate;
    a plurality of data lines extending in a first direction;
    a third transistor disposed on the side of the substrate and located in the sub-pixel region, one of a source and a drain of the third transistor being electrically connected to the second pixel electrode; and
    a plurality of common electrode lines extending in a second direction, and another of the source and the drain of the third transistor being electrically connected to a common electrode line of the plurality of common electrode lines, the second direction crossing the first direction, wherein
    the first pixel electrode and the second pixel electrode are insulated from each other; the first pixel electrode is electrically connected to the first transistor, and the second pixel electrode is electrically connected to the second transistor;
    an orthographic projection of the first pixel electrode on the substrate partially overlaps with an orthographic projection of the second pixel electrode on the substrate; or an orthographic projection of the first pixel electrode on the substrate does not overlap with an orthographic projection of the second pixel electrode on the substrate, and partial boundaries of the orthographic projection of the first pixel electrode on the substrate and the orthographic projection of the second pixel electrode on the substrate are tangential;
    one of a source and a drain of the first transistor is electrically connected to the first pixel electrode, and another of the source and the drain of the first transistor is electrically connected to a data line of the plurality of data lines; and one of a source and a drain of the second transistor is electrically connected to the first pixel electrode or the data line, and another of the source and the drain of the second transistor is electrically connected to the second pixel electrode.

2. The array substrate according to claim 1, wherein an area of the orthographic projection of the first pixel electrode on the substrate is greater than an area of the orthographic projection of the second pixel electrode on the substrate; or
    an area of the orthographic projection of the first pixel electrode on the substrate is greater than an area of the orthographic projection of the second pixel electrode on the substrate, and the second pixel electrode is closer to an edge of the sub-pixel region than the first pixel electrode and is located on at least one side of the first pixel electrode.

3. The array substrate according to claim 1, wherein the common electrode lines are disposed in a same layer as a gate of the first transistor, a gate of the second transistor, and a gate of the third transistor.

4. The array substrate according to claim 1, further comprising:
    a first electrode located in the sub-pixel region, the first electrode and the common electrode lines being disposed in a same layer, and the first electrode being electrically connected to the common electrode line; and
    a second electrode located in the sub-pixel region, the second electrode being disposed in a same layer as the source and the drain of the first transistor, and one of the source and the drain of the first transistor that is electrically connected to the first pixel electrode being further electrically connected to the second electrode, wherein
    the first electrode and the second electrode constitute a first storage capacitor.

5. The array substrate according to claim 1, further comprising:
    a third electrode located in the sub-pixel region, the third electrode and the common electrode lines being disposed in a same layer, and the third electrode being electrically connected to the common electrode line; and
    a fourth electrode located in the sub-pixel region, the fourth electrode being disposed in a same layer as the source and the drain of the second transistor, and one of the source and the drain of the second transistor that is electrically connected to the second pixel electrode being further electrically connected to the fourth electrode, wherein
    the third electrode and the fourth electrode constitute a second storage capacitor.

6. The array substrate according to claim 1, further comprising:
    a plurality of first gate lines, a plurality of second gate lines, and a plurality of third gate lines that are disposed in a same layer as a gate of the third transistor and extend in the second direction, wherein a gate of the first transistor is electrically connected to a first gate line of the plurality of first gate lines, a gate of the second transistor is electrically connected to a second gate line of the plurality of second gate lines, and the gate of the third transistor is electrically connected to a third gate line of the plurality of third gate lines; and
    at least one connection portion disposed in each sub-pixel region, the at least one connection portion being disposed in a same layer as the source and the drain of the third transistor, the first pixel electrode or the second pixel electrodes, wherein the first gate line, the second gate line and the third gate line are disposed on a same side of the first pixel electrode, each of two gate lines relatively far away from the first pixel electrode is electrically connected to a gate of a respective transistor through a connection portion; or the first gate line, the second gate line, and the third gate line are disposed on two opposite sides of the first pixel electrode, in two gate lines disposed on a side of the first pixel electrode, a gate line relatively far away from the first pixel electrode is electrically connected to a gate of a respective transistor through a connection portion.

7. The array substrate according to claim 1, further comprising: a passivation layer disposed between the first pixel electrode and the second pixel electrode, wherein
the passivation layer is provided with openings therein, and an opening exposes the second pixel electrode; and
an orthographic projection of the opening on the substrate and an orthographic projection of the first pixel electrode on the substrate do not overlap, and have a gap therebetween.

8. A manufacturing method for an array substrate, comprising:
providing a substrate, the substrate having a plurality of sub-pixel regions;
forming a first transistor and a second transistor in each sub-pixel region of the substrate; and
forming a first pixel electrode and a second pixel electrode in the sub-pixel region, wherein
forming the first pixel electrode and the second pixel electrode in the sub-pixel region includes:
forming the second pixel electrode on a side of the first transistor and the second transistor in the sub-pixel region away from the substrate; and
forming the first pixel electrode on a side of the second pixel electrode away from the substrate;
forming the first transistor and the second transistor in each sub-pixel region of the substrate includes:
forming a gate conductive layer on a side of the substrate, the gate conductive layer including a gate of the first transistor and a gate of the second transistor that are located in each sub-pixel region; and
forming a source-drain conductive layer on a side of the gate conductive layer away from the substrate, the source-drain conductive layer including a source and a drain of the first transistor and a source and a drain of the second transistor that are located in each sub-pixel region, and a plurality of data lines extending in a first direction; and
the method further comprises forming a third transistor in each sub-pixel region simultaneously during a process of forming the first transistor and the second transistor, wherein
the first pixel electrode and the second pixel electrode are insulated from each other; and the first pixel electrode is electrically connected to the first transistor, and the second pixel electrode is electrically connected to the second transistor;
an orthographic projection of the first pixel electrode on the substrate partially overlaps with an orthographic projection of the second pixel electrode on the substrate; or an orthographic projection of the first pixel electrode on the substrate does not overlap with an orthographic projection of the second pixel electrode on the substrate, and partial boundaries of the orthographic projection of the first pixel electrode on the substrate and the orthographic projection of the second pixel electrode on the substrate are tangential;
one of the source and the drain of the first transistor is electrically connected to the first pixel electrode, and another of the source and the drain of the first transistor is electrically connected to a data line of the plurality of data lines; and one of the source and the drain of the second transistor is electrically connected to the first pixel electrode or the data line, and another of the source and the drain of the second transistor is electrically connected to the second pixel electrode; and
the source-drain conductive layer further includes a source and a drain of the third transistor located in each sub-pixel region; the gate conductive layer further includes a plurality of common electrode lines extending in a second direction and a gate of the third transistor located in each sub-pixel region, the second direction crossing the first direction; and one of the source and the drain of the third transistor is electrically connected to the second pixel electrode, and another of the source and the drain of the third transistor is electrically connected to a common electrode line of the plurality of common electrode lines.

9. The manufacturing method for the array substrate according to claim 8, further comprising:
forming at least one connection portion in each sub-pixel region simultaneously during a process of forming the source and the drain of the first transistor, the source and the drain of the second transistor, and the source and the drain of the third transistor; or forming at least one connection portion in each sub-pixel region simultaneously during a process of forming the second pixel electrode; or forming at least one connection portion in each sub-pixel region simultaneously during a process of forming the first pixel electrode; wherein
the gate conductive layer further includes: a plurality of first gate lines, a plurality of second gate lines, and a plurality of third gate lines that extend in the second direction; the gate of the first transistor is electrically connected to a first gate line of the plurality of first gate lines, the gate of the second transistor is electrically connected to a second gate line of the plurality of second gate lines, and the gate of the third transistor is electrically connected to a third gate line of the plurality of third gate lines;
the first gate line, the second gate line and the third gate line are disposed on a same side of the first pixel electrode, each of two gate lines relatively far away from the first pixel electrode is electrically connected to a gate of a respective transistor through a connection portion; or the first gate line, the second gate line, and the third gate line are disposed on two opposite sides of the first pixel electrode, in two gate lines disposed on a side of the first pixel electrode, a gate line relatively far away from the first pixel electrode is electrically connected to a gate of a respective transistor through a connection portion.

10. An electronic paper display apparatus, comprising:
the array substrate according to claim 1;
an opposite substrate opposite to the array substrate; and
a plurality of charged particles disposed between the array substrate and the opposite substrate.

11. A driving method for the electronic paper display apparatus according to claim 10, comprising:
in a first temperature, controlling the first transistor in the array substrate of the electronic paper display apparatus to be turned on to charge the first pixel electrode in the array substrate, and controlling the second transistor in the array substrate to be turned off; and in a second temperature, controlling the first transistor and the second transistor to be turned on to charge the first pixel electrode and the second pixel electrode in the array substrate, wherein the first temperature is greater than the second temperature.

12. The driving method according to claim 11, wherein the array substrate includes third transistors each located in a respective sub-pixel region, data lines, first gate lines, second gate lines, third gate lines, and common electrode lines;

controlling the first transistor in the array substrate of the electronic paper display apparatus to be turned on to charge the first pixel electrode in the array substrate, and controlling the second transistor in the array substrate to be turned off, includes:

transmitting a first control signal to the first transistor through a first gate line of the first gate lines to control the first transistor to be turned on; and transmitting a data voltage to the first pixel electrode through a data line of the data lines to charge the first pixel electrode; and transmitting a second control signal to the second transistor through a second gate line of the second gate lines to control the second transistor to be turned off;

controlling the first transistor and the second transistor to be turned on to charge the first pixel electrode and the second pixel electrode, includes:

transmitting the first control signal to the first transistor through the first gate line to control the first transistor to be turned on; transmitting a fourth control signal to the second transistor through the second gate line to control the second transistor to be turned on; and transmitting the data voltage to the first pixel electrode and the second pixel electrode through the data line to charge the first pixel electrode and the second pixel electrode; and the driving method further comprises:

in the first temperature, transmitting a third control signal to the third transistor through a third gate line of the third gate lines to control the third transistor to be turned on; and transmitting a common voltage to the second pixel electrode through a common electrode line of the common electrode lines to charge the second pixel electrode; and in the second temperature, transmitting a fifth control signal to the third transistor through the third gate line to control the third transistor to be turned off.

* * * * *